(12) United States Patent
Asai et al.

(10) Patent No.: US 12,348,588 B2
(45) Date of Patent: *Jul. 1, 2025

(54) COMMUNICATION DEVICE AND COMMUNICATION METHOD

(71) Applicant: TOYOTA JIDOSHA KABUSHIKI KAISHA, Toyota (JP)

(72) Inventors: Hirochika Asai, Chiyoda-ku (JP); Ryokichi Onishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,069

(22) Filed: Jan. 19, 2024

(65) Prior Publication Data

US 2024/0171639 A1 May 23, 2024

Related U.S. Application Data

(63) Continuation of application No. 18/041,355, filed as application No. PCT/JP2021/029629 on Aug. 11, 2021, now Pat. No. 11,917,020.

(30) Foreign Application Priority Data

Aug. 12, 2020 (JP) .................................. 2020-136428

(51) Int. Cl.
*H04L 67/141* (2022.01)
*H04L 67/143* (2022.01)

(52) U.S. Cl.
CPC .......... *H04L 67/141* (2013.01); *H04L 67/143* (2013.01)

(58) Field of Classification Search
CPC . H04L 67/141; H04L 47/2475; H04L 67/143; H04L 47/125; H04L 47/28; H04W 4/40; H04W 28/0273
See application file for complete search history.

(56) References Cited

U.S. PATENT DOCUMENTS 8,510,451 B2  8/2013  Wada
9,712,621 B1  7/2017  Bowen
(Continued)

FOREIGN PATENT DOCUMENTS

CN  101552788 A  10/2009
EP    2107762 A2   9/2011
(Continued)

OTHER PUBLICATIONS

De Bruijn, Willem et al.; "Optimizing UDP for Content Delivery: GSO, Pacing and Zerocopy", retrieved on Jun. 10, 2020; http://vger.kernel.org/lpc_net2018_talks/willemdebruijn-lpc2018-udpgso-paper-DRAFT-1.pdf.

(Continued)

*Primary Examiner* — Caroline H Jahnige
(74) *Attorney, Agent, or Firm* — Finnegan, Henderson, Farabow, Garrett, and Dunner, LLP

(57) ABSTRACT

Provided are a communication device and a communication method for reducing a processing load at the time of receiving or transmitting data. A communication device according to an embodiment includes: a receiver that receives a connection request for transmitting data for an application, and receives the data after receiving the connection request; and a processor that notifies the application of the reception of the connection request after the data is received.

8 Claims, 12 Drawing Sheets

(56) References Cited

U.S. PATENT DOCUMENTS

| | | | |
|---|---|---|---|
| 9,992,309 B2 | 6/2018 | Kawazoe et al. | |
| 2006/0015618 A1* | 1/2006 | Freimuth | H04L 49/90 |
| | | | 711/E12.057 |
| 2009/0254664 A1 | 10/2009 | Wada | |
| 2014/0143315 A1 | 5/2014 | Kawazoe et al. | |
| 2021/0258258 A1 | 8/2021 | Takagi et al. | |

FOREIGN PATENT DOCUMENTS

| | | | | |
|---|---|---|---|---|
| JP | 2003008611 A * | 1/2003 | | |
| JP | 2006-060599 A | 3/2006 | | |
| JP | 2007-189383 A | 7/2007 | | |
| JP | 2009-266202 A | 11/2009 | | |
| JP | 2014-103553 A | 6/2014 | | |
| JP | 2015-002397 A | 1/2015 | | |
| WO | WO-2013053304 A1 * | 4/2013 | | H04W 80/06 |

OTHER PUBLICATIONS

Menon, Aravind, et al.; "Optimizing TCP Receive Performance", School of Computer and Communication Sciences, retrieved on Jun. 10, 2020 https://www.usenix.org/legacy/event/usenix08/tech/full_papers/menon/menon_html/.

Suzuki, Shota; "Easy Guide for Beginners: How the Linus Kernel Works", No. 4, TCP/IP Network, vol. 16, No. 8, NIKKEI Linux, Jul. 8, 2014, pp. 112-117.

FreeBSD, Accept Filter, Mar. 4, 2015 https://web.archive.org/web/20150304173901/https://kaworu.jpn.org/freebsd/Accept_Filter.

Linux socket accept system call and TCP_DEFER_ACCEPT; Oct. 2, 2017 https://web.archive.org/web/20171002072923/https://kaworu.jpn.org/kaworu/2011-09-10-1.php.

PCT Notification of Transmittal of Translation of the International Preliminary Report on Patentability (Chapter I or Chapter II of the Patent Cooperation Treaty) from the International Bureau and Written Opinion of the International Searching Authority regarding International Application No. PCT/JP2021/029629, mailed Feb. 23, 2023.

Office Action issued in Japanese Patent Application No. 2024-025830 on Apr. 22, 2025.

FreeBSD Manual Pages, URL: https://man.freebsd.org/cgi/man.cgi?query=accf_http&sektion=9, Nov. 15, 2000, 2 pages.

\* cited by examiner

COMMUNICATION DEVICE AND COMMUNICATION METHOD

FIELD

This application is a continuation of U.S. patent application Ser. No. 18/041,355 (having a national phase entry date of Feb. 10, 2023), which is a national stage of International Application No. PCT/JP2021/029629, filed Aug. 11, 2021, and is based upon and claims the benefit of priority from the prior Japanese Patent Application No. 2020-136428, filed Aug. 12, 2020, the entire contents of each of which are incorporated herein by reference.

CROSS REFERENCE TO RELATED APPLICATIONS

This application is based upon and claims the benefit of priority from the prior Japanese Patent Application No. 2020-136428, filed on Aug. 12, 2020, the entire contents of which are incorporated herein by reference.

BACKGROUND

In packet-switching communication, a series of data is divided into packets (also referred to as datagrams or segments) and delivered from a transmission device to a reception device. The transmission device performs processing for converting a data string into a packet, and the reception device performs processing for restoring the packet into the data string. This processing is usually performed by dividing and copying data on a memory of a host computer. Various techniques have been developed to reduce a load caused by the copying.

Techniques for minimizing copying at the time of transmission include TCP segmentation offload (TSO), generic segmentation offload (GSO) or large send offload (LSO) obtained by abstracting TSO. In these techniques, data larger than a packet is transferred to a network interface card (NIC), which is a peripheral device, and the NIC performs packetization and header assignment. As a result, in the host computer, division and copy of data can be omitted, thereby greatly reducing a load. Such a technique is also called zero copy.

There is also a technology called large receive offload (LRO) in which zero copy is realized by a reception device. In the LRO, a data string is restored from a packet received by the NIC and transferred to the host computer. As a result, memory copy accompanying the restoration in the host computer is omitted.

As described above, a zero copy technique for omitting memory copy in a host computer has been developed, but there has been no mechanism for offloading a load on a large number of sessions. For example, since the number of sessions (the number of contexts) that can be offloaded by the NIC is limited in the reception device, a large number of sessions cannot be handled.

In addition, session management is usually performed by an operating system of the reception device. When a session is started in the operating system, a user program creates a file descriptor (socket) and performs reception processing such as waiting for reception. A process or a thread may be created for the reception processing. In addition, a large number of file descriptors, processes, or threads may be created to wait for reception, resulting in a significant deterioration in performance. For this reason, scale expandability (scalability) is poor.

CITATION LIST

Non Patent Literature

Non Patent Literature 1: Willem de Bruijn and Eric Dumazet, "Optimizing UDP for content delivery: GSO, pacing and zerocopy", [Online], [Searched on Jun. 10, 2020], Internet <URL: http://vger.kernel.org/lpc_net2018_talks/willemdebruijn-lpc2018-udpgso-paper-DRAFT-1.pdf>

Non Patent Literature 2: Aravind Menon and Willy Zwaenepoel, "Optimizing TCP Receive Performance", [Online], School of Computer and Communication Sciences [Searched on Jun. 10, 2020], Internet <URL: https://www.usenix.org/legacy/event/usenix08/tech/full_papers/men on/menon_html/

PROBLEM TO BE SOLVED

Embodiments of the present invention provide a communication device and a communication method for reducing a processing load at the time of receiving or transmitting data.

SUMMARY

A communication device according to the present embodiment includes: a receiver that receives a connection request for transmitting data for an application, and receives the data after receiving the connection request; and a processor that notifies the application of the reception of the connection request after the data is received.

A communication device according to the present embodiment includes: receiving a first connection request for transmitting data for an application via a first communication medium; receiving the data via the first communication medium after receiving the first connection request; transmitting a second connection request for transmitting the data via a second communication medium before the reception of the data is terminated after receiving the first connection request; and transmitting the data via the second communication medium after transmitting the second connection request.

A communication method according to the present embodiment includes: receiving a connection request for transmitting data for an application; receiving the data after receiving the connection request; and notifying the reception of the connection request to the application after receiving the data.

A communication method according to the present embodiment includes: receiving a first connection request for transmitting data for an application via a first communication medium; receiving the data via the first communication medium after receiving the first connection request; transmitting a second connection request for transmitting the data via a second communication medium before the reception of the data is terminated after receiving the first connection request; and transmitting the data via the second communication medium after transmitting the second connection request.

DETAILED DESCRIPTION

Figure 1:
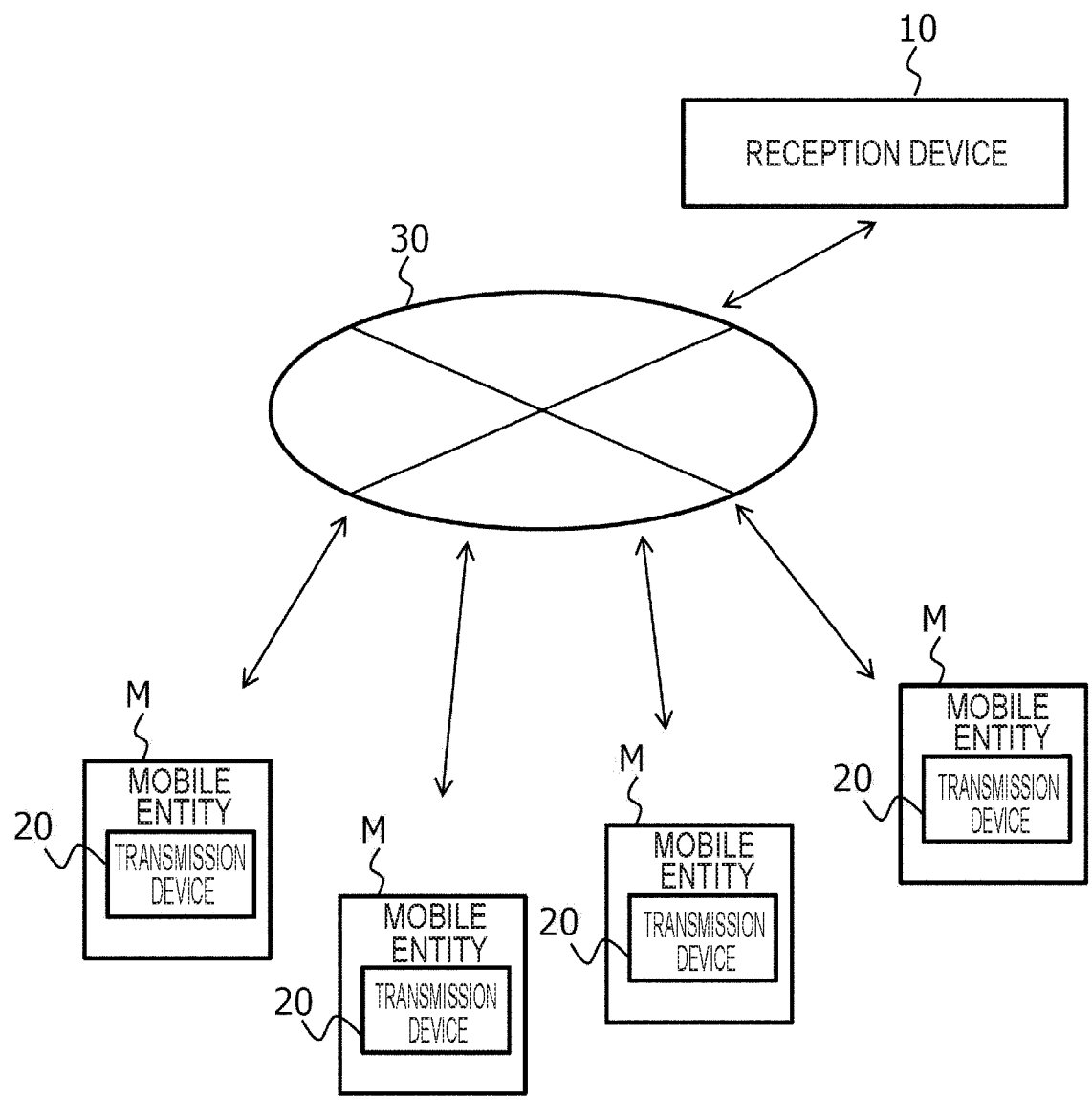
FIG. 1 is a block diagram of a data transmission system according to a first embodiment.

Hereinafter, embodiments of the present disclosure will be described with reference to the drawings. The drawings schematically illustrate the embodiments of the present disclosure as examples, and the embodiments of the present disclosure are not limited to the forms disclosed in the drawings.

First Embodiment

FIG. 1 is a block diagram of a data transmission system according to the present embodiment. The data transmission system of FIG. 1 includes a reception device 10 and a plurality of mobile entities M each having a transmission device 20 mounted thereon. The reception device 10 and the transmission device 20 correspond to an example of a communication device or a wireless communication device according to the present embodiment.

The mobile entity M is any type of mobile entity such as an automobile, a robot, a ship, a drone, a mobile terminal (a smartphone, a tablet terminal, or the like), or a train. Although the transmission device 20 is mounted on the mobile entity in the present embodiment, the transmission device 20 may be mounted on a fixedly installed terminal or machine. In the present embodiment, it is assumed that the mobile entity M is an automobile. The automobile may be either an automobile having a function of assisting a user's driving or an autonomous driving vehicle that autonomously make determinations during driving.

The transmission device 20 is connected to a communication network 30. The communication network 30 is, for example, a network such as a mobile network or a wireless local area network (LAN). Examples of the mobile network include a 3G network, an LTE network, a next generation (5G) network, and the like, and any type of network may be used. Furthermore, the communication network 30 may be a wireless network or a wired network. The communication network 30 may include a plurality of types of networks. In this case, the transmission device 20 may select a network to be used for communication with the reception device 10 from the plurality of types of networks. Although the transmission device 20 performs wireless communication in the present embodiment, the transmission device 20 may be configured to perform wired communication.

The transmission device 20 acquires data from one or more sensors provided in the mobile entity M. The one or more sensors detect data to be provided to one or more applications in the reception device. The transmission device 20 transmits data to the reception device 10 for each of the one or more applications. More specifically, the transmission device 20 generates a packet including data and transmits the generated packet to the reception device 10. Examples of the plurality of sensors include a camera, a GPS, a light detecting and ranging (LiDAR), a speed sensor, an acceleration sensor, a sensor for detecting vehicle control data (an engine rotation state, an accelerator pressing state, etc.), a sensor for detecting sudden braking, a sensor for detecting an obstacle (a falling object or a front vehicle), and the like.

The reception device 10 is connected to the communication network 30. The reception device 10 is disposed, for example, in the mobile network. The reception device 10 may be an edge controller of the mobile network. The reception device 10 receives data for one or more applications from the mobile entity M. More specifically, the reception device 10 receives a packet including data. The reception device 10 includes one or more applications for processing the data transmitted from the mobile entity M. The reception device 10 passes each piece of the data acquired from the mobile entity M to a corresponding application.

Examples of the plurality of applications include an application for generating a high-definition map, an application for generating an engine control optimization model, an application for generating road safety information, and the like. As an example, a data transmission time constraint for the application for generating a high-definition map and the application for generating an engine control optimization model is long (1 minute, 1 hour, 1 day, or the like). On the other hand, a data transmission time constraint for the application for generating road safety information is short (e.g., 10 seconds or less). Such transmission time constraint information may be shared between the transmission device 20 and the reception device 10. As an example, data having a short time constraint corresponds to data having a high priority, and data having a long time constraint corresponds to data having a low priority.

In a case where the reception device 10 functions as a relay device, the reception device 10 as a relay device may transmit data received from the transmission device 20 of the mobile entity M to another device (e.g., a server) including one or more applications.

The transmission device 20 of the mobile entity M and the reception device 10 may communicate with each other via a base station. In this case, the transmission device 20 is connected to a nearby base station in a wireless manner by performing a predetermined connection process. The transmission device 20 of the mobile entity M communicates with the reception device 10 via the base station connected thereto. The reception device 10 is connected to the base station in a wireless or wired manner. The reception device 10 may be connected to a plurality of base stations or may be connected to a base station on a one-to-one basis. One or more relay devices including a base station may be present in a transmission path between the transmission device 20 and the reception device 10.

In the present embodiment, when the reception device 10 receives data from one or more transmission devices 20, it is realized that an application processing load is reduced in the reception device 10.

Figure 2:
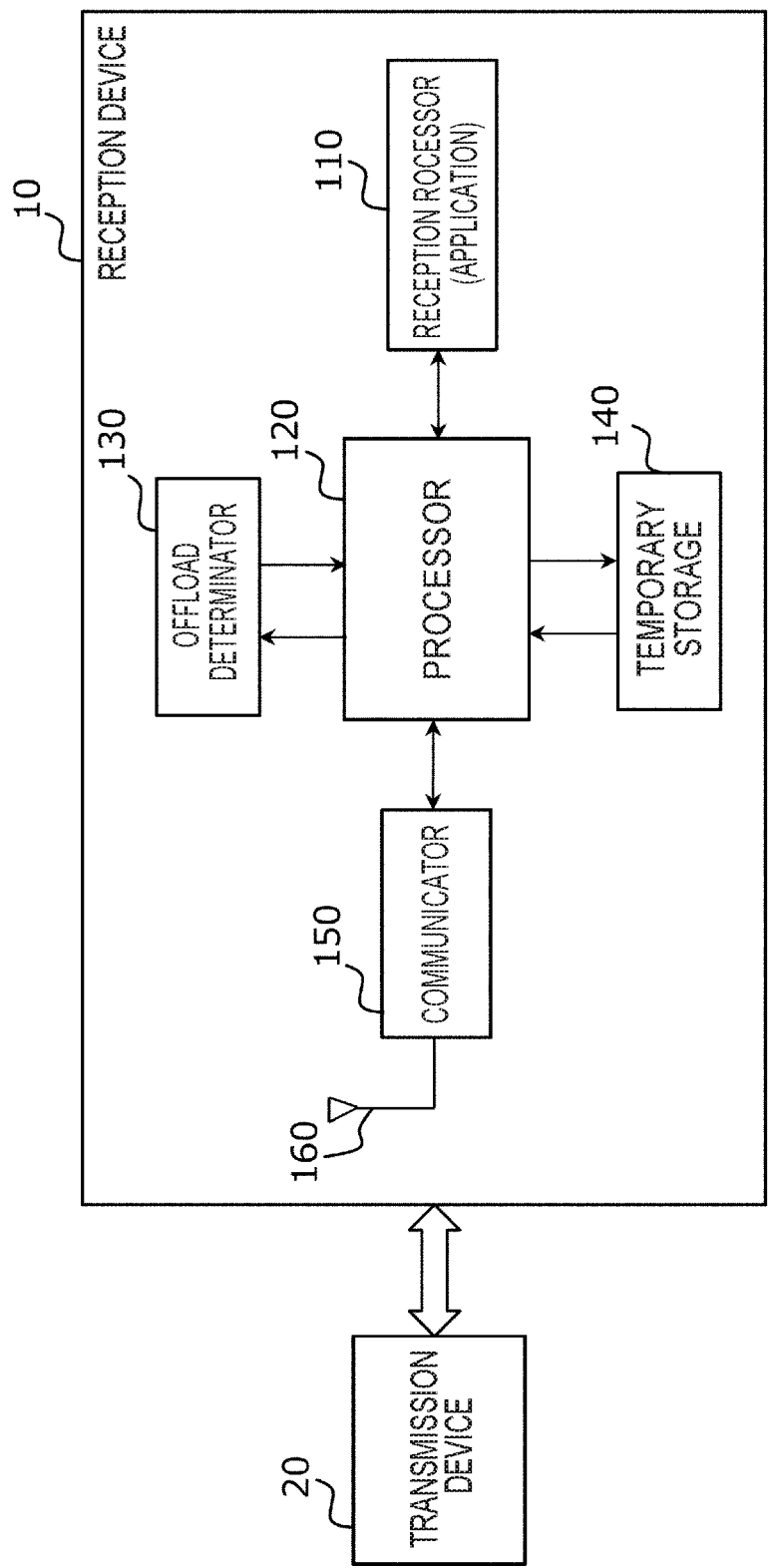
FIG. 2 is a block diagram of a reception device according to the first embodiment.

FIG. 2 is a block diagram of the reception device 10 according to the present embodiment. The reception device 10 communicates with the transmission device 20. Although only one transmission device 20 is illustrated in FIG. 2, there may be a plurality of transmission devices 20. Also, the number of reception devices 10 is not limited to one. The configuration of the reception device 10 illustrated in FIG. 2 only shows elements necessary for the description of the present embodiment, and may include various other elements such as an input unit to which a user inputs an instruction or data and an output unit that presents information to the user. Although the reception device 10 illustrated in FIG. 2 performs wireless communication with the transmission device 20, a configuration in which the reception device 10 performs wired communication is also not excluded.

The reception device 10 includes a reception processor 110, a processor 120, an offload determinator 130 (a determinator), a temporary storage 140, a communicator 150 (a receiver), and at least one antenna 160.

The reception processor 110 is an application executor that executes one or more applications to acquire data transmitted from the transmission device 20 and perform processing based on the acquired data. Examples of the applications include an application for generating a high-definition map, an application for generating an engine control optimization model, and an application for generating road safety information, but these are merely examples, and there are various other applications. The reception processor 110 may include a CPU and a memory.

The application of the reception processor 110 performs an operation of waiting for, for example, a notification from the processor 120 that a transmission control protocol (TCP) connection request has been received from the transmission device 20. When notified via the processor 120 that the connection request has been received from the transmission device 20, the application starts an operation of waiting for data from the transmission device 20. The application issues a data read command to the processor 120 that receives (receive by proxy) data from the transmission device 20 instead of the application, and performs an operation of acquiring the data from the processor 120. The read command may include an argument designating a size of data to be read. Alternatively, the read command may be configured to read data having a certain size.

As a specific example, the application generates a file descriptor that identifies a socket using a socket ( ) system call. The application allocates a standby port number (e.g., a port number of TCP) for reception to the socket using a bind ( ) system call. The application prepares to wait for a connection request from the transmission device 20 using a listen ( ) system call or the like. The application starts an operation of waiting for a connection request using an accept ( ) system call or the like. When receiving a normal response to the accept ( ) system call from the processor 120, the application waits for data from the transmission device 20. The normal response to the accept ( ) system call corresponds to information notifying that a connection request has been received from the transmission device 20. The data transmitted from the transmission device 20 is received by the processor 120 as a proxy, and the application performs a process of acquiring the data received from the transmission device 20 from the processor 120, for example, using a receive ( ) system call. The size of data to be read may be designated by an argument of receive ( ) Data is sequentially acquired from the processor 120 by repeating the receive ( ) system call. When the acquisition of the data from the processor 120 is completed (for example, when all the data received from the transmission device 20 is acquired), the application disconnects the socket.

The communicator 150 communicates with the transmission device 20 by transmitting and receiving wireless signals via the antenna 160. When receiving a connection request for communication from the transmission device 20 via the communication network 30, the communicator 150 provides the connection request to the processor 120. When acquiring an acknowledgement response to the connection request from the processor 120, the communicator 150 transmits the acknowledgement response to the transmission device 20. After transmitting the acknowledgement response, the communicator 150 receives a data string transmitted from the transmission device 20. More specifically, the communicator 150 sequentially receives packets including data. The communicator 150 provides the packets to the processor 120.

The communicator 150 includes a receiver that receives a connection request for transmitting data for an application from the transmission device 20, and receives data transmitted from the transmission device 20 after the connection request is received. In the receiver, the hardware circuit receiving a connection request and the hardware receiving data may be the same, or the hardware circuit receiving a connection request and the hardware receiving data may be different.

The processor 120 performs processing related to transmission and reception of data between the transmission device 20 and the reception processor 110. The processor 120 has a function of performing offload processing of receiving data addressed to an application by proxy after receiving a connection request from the transmission device 20, and temporarily waiting for notification to the application. The processor 120 performs processing related to IP/TCP as an example. The communicator 150 may further perform processing related to a data link layer and a physical layer. The communicator 150 may perform processing related to a data link layer and a physical layer. As an example, the processor 120 may be configured by a dedicated hardware circuit, may be configured by a program, or may be configured by both of them.

The processor 120 is configured by a kernel or an operating system (OS) as an example. The processor 120 uses, for example, Internet protocol (IP)/transmission control protocol (TCP) as a communication protocol of an Internet layer and a transport layer. In the present embodiment, it is assumed that IP/TCP is used. However, a case where another communication protocol such as IP/user datagram protocol (UDP) is used is not excluded.

Upon receiving a connection request from the transmission device 20, the processor 120 determines whether a connection request destination is an application performing an operation of waiting for a connection request (e.g., an application that has made an accept ( ) system call). When the connection request destination is not an application performing an operation of waiting for a connection request, a connection rejection notification is transmitted to the transmission device 20. When the connection request destination is an application performing an operation of waiting for a connection request, the processor 120 requests the offload determinator 130 to determine whether a data string transmitted by the transmission device 20 or an application of a transmission destination is an offload target (that is, whether to perform offload processing). A timing for providing a notification of a connection request received from the transmission device 20 to the application is controlled depending on whether or not the data string or the application is an offload target. The offload determinator 130 includes a determinator that decides a timing for notifying the reception of the connection request to the application on the basis of the information regarding the data or the application.

An example of the information regarding the data or the application includes instruction information (an offload target flag) for designating whether to perform offload processing. The offload target flag is included, for example, in a header of a packet on the transmission device 20 side. The processor 120 detects the offload target flag from the header of the received packet. When the offload target flag is a first value (e.g., "1"), it may be determined to perform offload processing, and when the offload target flag is a second value (e.g., "0"), it may be determined not to perform offload processing. The offload target flag may be obtained from the application.

The information regarding the data or the application may be a priority of the data or the application. In a case where the data string is data having a long allowable delay time, for example, streaming data such as image and sound, a low priority (e.g., a low degree of urgency) is set to the data. In a case where the data string is data having a short allowable delay time, such as non-streaming data, a high priority (e.g., a high degree of urgency) is set to the data. The offload determinator 13 may determine not to perform offload processing when the priority is high, and may determine to perform offload processing when the priority is low. As an example, when the priority is equal to or higher than a threshold value, it may be determined that the priority is high, and it may be determined not to perform offload processing. On the other hand, when the priority is lower than the threshold value, it may be determined that the priority is low, and it may be determined to perform offload processing. The priority may be included in the header of the packet or may be acquired from the application.

Furthermore, the information regarding the data or the application may be the type of a sensor that has detected the data. For example, in a case where the type of the sensor is a camera that generates streaming data, it is determined to perform offload processing, and in a case where the type of the sensor is a sensor that detects sudden braking, it is determined not to perform offload processing. The type of the sensor may be included in the header of the packet or may be acquired from the application.

Furthermore, the information regarding the data or the application may be the type of an application of a data transmission destination. For example, in a case where a port number to be used is determined for each application, the port number to be used by the application may be acquired from the header to identify the type of the application.

In a case where the information regarding the data or the application (offload target flag, priority, sensor type, port number, or the like) is included in the header of the packet, for example, the information may be included in the header of the packet of the connection request. A reserved field of a header (a header of IP, TCP, or the like) of an existing protocol may be used, or a header of an independently defined protocol may be used.

In addition, in a case where the information regarding the data or the application is acquired from the application, the information may be included in a function executed by the application as an argument. For example, "TAILAWARE" instructing return of a notification (e.g., accept ( ) return) after reception of last data may be added to socket ( ) as an argument. When "TAILAWARE" is included in socket ( ) it is decided to perform offload processing. The "TAILAWARE" corresponds to an example of instruction information for designating whether to perform offload processing.

The offload determinator 130 provides, to the processor 120, a result of determining whether to perform offload processing (whether the data string received from the transmission device 20 is an offload target).

The determination result that offload processing is not performed means that the reception of the connection request is notified to the application at a normal timing (first timing). Examples of the normal timing (first timing) include a timing at which the connection request is received, a timing after the connection request is received and before an acknowledgement response is returned, and a timing after the acknowledgement response is returned and before reception of data is started. The determination result that offload processing is performed means that a notification is provided to the application at a timing (second timing) after data is received. The second timing is a timing when a condition (connection notification condition) for notifying the connection request to the application is satisfied.

When it is determined not to perform offload processing, the processor 120 notifies the application of the reception of the connection request from the transmission device 20 at a normal timing. A specific example of the provision of the notification includes returning a normal response to an accept ( ) system call to the application.

When it is determined to perform offload processing, the processor 120 notifies the application of the reception of the connection request at a timing (second timing) when the connection notification condition is satisfied. As an example, it is determined whether the connection notification condition is satisfied on the basis of a data reception status. When the connection notification condition is not satisfied, the reception of the connection request from the transmission device 20 is not notified to the application. When the connection notification condition is satisfied, the reception of the connection request is notified to the application. Examples of the case where the connection notification condition is satisfied include a case where the reception of the data is terminated (e.g., a case where all of a plurality of pieces of data transmitted from the transmission device 20 are received), and a case where a connection termination request is received from the transmission device 20. The connection notification condition will be described in detail below.

The processor 120 generates an acknowledgement response to the connection request in both a case where the offload determinator 130 determines not to perform offload processing and a case where the offload determinator 130 determines to perform offload processing. The processor 120 transmits the acknowledgement response to the transmission device 20 via the communicator 150.

After transmitting the acknowledgement response, the processor 120 sequentially receives data transmitted from the transmission device 20 via the communicator 150. The processor 120 stores the data received from the transmission device 20 in the temporary storage 140.

The temporary storage 140 is a storage or a storage device having a storage area of a predetermined size. As an example, the temporary storage 140 includes a recording medium such as a memory or a hard disk. The memory includes a volatile memory, a non-volatile memory, or both of them.

In a case where a connection termination request is received from the transmission device 20 after reception of data from the transmission device 20 is started, the processor 120 terminates the reception of the data from the transmission device 20. The termination request corresponds to, for example, information notifying termination of data transmission. The termination of the data reception may be decided by a method other than the reception of the termination request. For example, the termination of the data reception may be decided when a predetermined amount of data is received or when a predetermined number of pieces of data is received.

When it is determined not to perform the above-described offload processing, the processor 120 notifies the application of the reception of the connection request at a normal timing, and then receives a data read command from the application. Whenever a read command is received, the processor 120 reads data from the temporary storage 140 and outputs (provides) the read data to the application. When completing the acquisition of the data received from the transmission device 20, the application disconnects the socket.

The data output to the application by the processor 120 is, for example, data of a layer higher than TCP (a payload portion of the TCP). Meanwhile, header information of at least one of TCP and IP may also be output to the application. In addition, in a case where a header of an independently defined protocol is added to a layer upper than the TCP, a header and a payload portion of a layer higher than the independently defined protocol may be output to the application.

When it is determined to perform offload processing, the processor 120 stores data received from the transmission device 20 in the temporary storage 140 in parallel with determining whether the connection notification condition is satisfied on the basis of the data received from the transmission device 20.

As an example, when the reception of the data string from the transmission device 20 is terminated (for example, when all the data is received), the processor 120 determines that the connection notification condition is satisfied. Specifically, when a connection termination request is received from the transmission device 20, it is determined that the connection notification condition is satisfied.

Alternatively, it may be determined that the connection notification condition is satisfied when a predetermined amount of data is received. Alternatively, it may be determined that the connection notification condition is satisfied on the basis of a ratio of an amount of data that has already been received to an amount of data to be received from the transmission device 20.

In addition, information (offload termination flag) for instructing termination of offload processing may be set for data on the transmission device 20 side, and it may be determined that the connection notification condition is satisfied on the basis of the offload termination flag. For example, a header of a packet of the transmission device 20 includes an offload termination flag. While the offload termination flag is in an off state (e.g., "0"), it is determined that the connection notification condition is not satisfied. When the offload termination flag becomes an on state (e.g., "1"), it is determined that the connection notification condition is satisfied.

The connection notification condition described above is an example, and the connection notification condition may be defined by another method.

When the connection notification condition is satisfied, the processor 120 notifies the application of the reception of the connection request from the transmission device 20. For example, a normal response to an accept ( ) system call is returned to the application. After notifying the reception of the connection request to the application, the processor 120 sequentially receives data read commands from the application. Whenever a read command is received, the processor 120 reads data having a size designated by the read command from the temporary storage 140, and outputs (provides) the read data to the application. When all the data received from the transmission device 20 is provided to the application, the application disconnects the socket.

The application may set an allowable delay value as an argument when performing the above-described accept ( ) system call. In this case, the application waits for a normal response to the accept ( ) system call until a period indicated by the allowable delay value elapses. The allowable delay value may be set using another function. For example, a setsockopt ( ) function that sets options related to a socket may be used.

The data output from the processor 120 to the application is similar to the data output to the application when it is determined not to perform offload processing.

Figure 3:
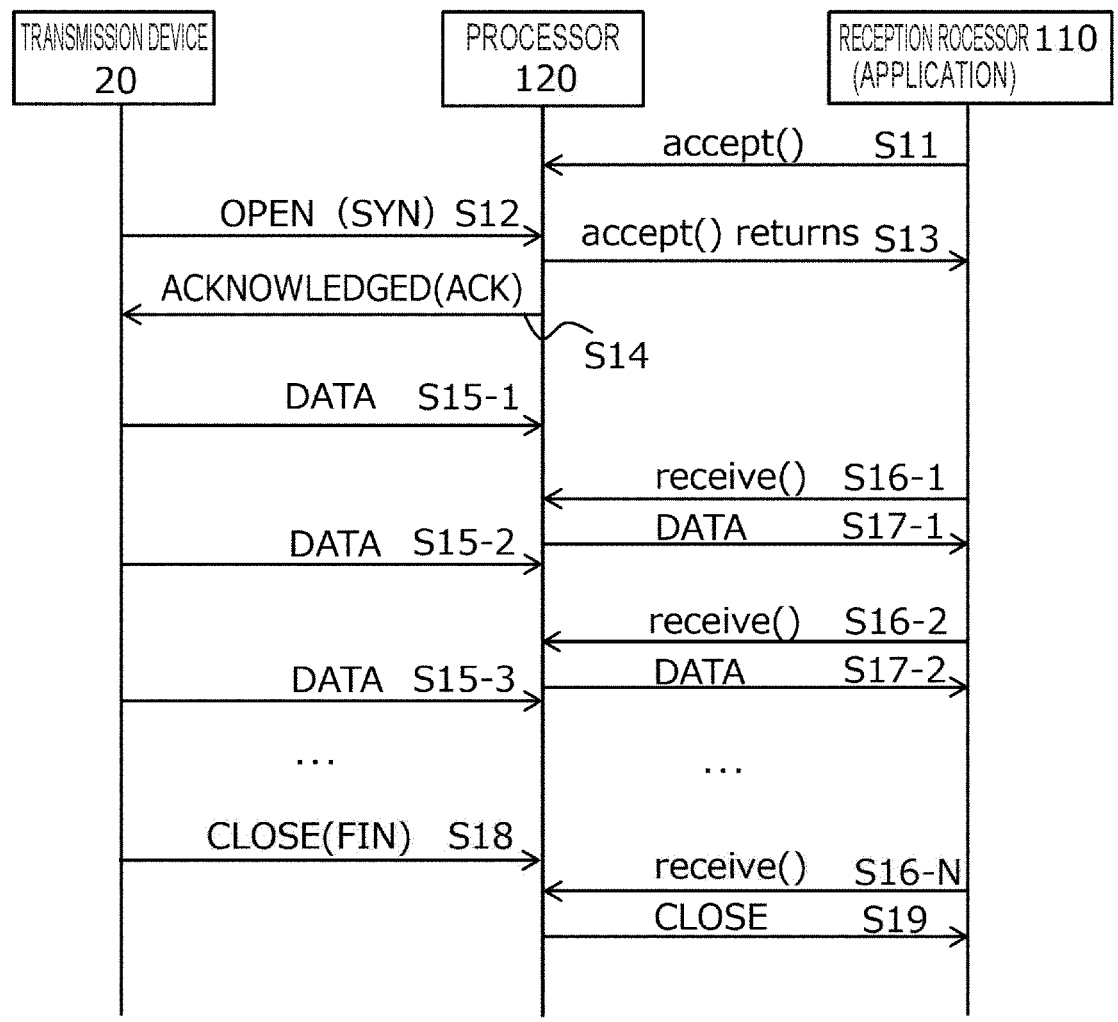
FIG. 3 is a diagram illustrating an operation sequence example in a case where the reception device receives data from a transmission device.

FIG. 3 illustrates an example of an operation sequence of the transmission device 20 in a case where offload processing is not performed. The application of the reception processor 110 executes an accept ( ) system call to wait for a connection request from the transmission device 20 (S11). When receiving the connection request from the transmission device 20 (S12), the processor 120 requests the offload determinator 130 to determine whether to perform offload processing on a data string to be received from the transmission device 20 from now on. When the offload determinator 130 determines not to perform offload processing, a normal response to the accept ( ) system call is immediately returned to the application, thereby notifying the reception of the connection request to the application (S13). The application starts an operation of waiting for data from the transmission device 20. The processor 120 transmits an acknowledgement response to the connection request to the transmission device 20 via the communicator 150 (S14).

The processor 120 sequentially receives data transmitted from the transmission device 20 via the communicator 150 (S15-1, S15-2, S15-3, . . . ). The processor 120 transmits an acknowledgement response to each piece of data to the transmission device 20. The processor 120 sequentially stores the data received from the transmission device 20 in the temporary storage 140. After receiving all the data from the transmission device 20, a connection termination request (data transmission termination notification) is received from the transmission device 20 (S18).

In parallel with the sequences S15-1, S15-2, S15-3, . . . , the processor 120 receives a data read command from the application (S16-1, S16-2, . . . , and S16-N). The processor 120 reads data having a size designated by the read command from the temporary storage 140, and outputs (provides) the read data to the application (S17-1, S17-2, . . . ). When all the data received from the transmission device 20 is provided to the application, the processor 120 notifies the application of termination of reading (S19). The application notified of the termination of reading disconnects the socket.

Figure 4:
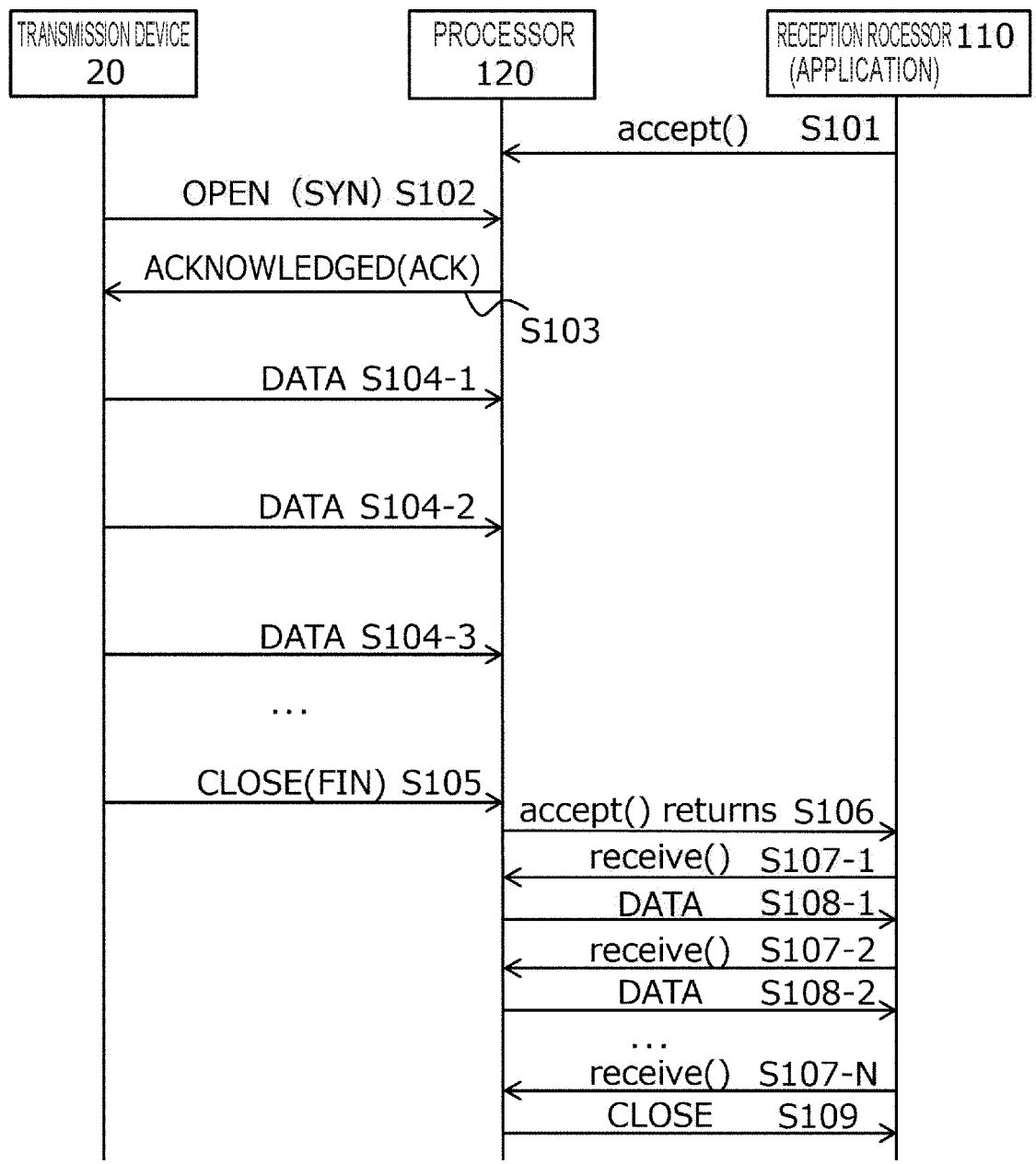
FIG. 4 is a diagram illustrating another operation sequence example in a case where the reception device receives data from the transmission device.

FIG. 4 illustrates an example of an operation sequence of the transmission device 20 in a case where offload processing is performed. Here, an operation in a case where the application is notified of the reception of the connection request (the connection notification condition is satisfied) when all the data is received from the transmission device 20 will be described.

The application of the reception processor 110 executes an accept ( ) system call to wait for a connection request from the transmission device 20 (S101). When receiving the connection request from the transmission device 20 (S102), the processor 120 requests the offload determinator 130 to determine whether to perform offload processing on a data string to be received from the transmission device 20 from now on. When the offload determinator 130 determines to perform offload processing, the processor 120 does not return a normal response to the accept ( ) system call to the application at this time point. The processor 120 transmits an acknowledgement response to the connection request to the transmission device 20 via the communicator 150 (S103).

The processor 120 sequentially receives data transmitted from the transmission device 20 via the communicator 150 (S104-1, S104-2, S104-3, . . . ). The processor 120 transmits an acknowledgement response to each piece of data to the transmission device 20. The processor 120 sequentially stores the data received from the transmission device 20 in the temporary storage 140. After receiving all the data from the transmission device 20, a connection termination request is received from the transmission device 20 (S105).

When receiving the connection termination request, the processor 120 returns a normal response to the accept ( ) system call to the application (S106). As a result, the application is notified of the reception of the connection request from the transmission device 20. The application notified of the reception of the connection request starts an operation of waiting for data from the transmission device 20. The processor 120 receives a data read command from the application (S107-1, S107-2, . . . , S107-N). The processor 120 reads data having a size designated by the read command from the temporary storage 140, and outputs (provides) the read data to the application (S108-1, S108-2, . . . ). When all the data received from the transmission device 20 is provided to the application, the processor 120 notifies the transmission device 20 of termination of reading (S109). The application notified of the termination of reading disconnects the socket.

In the sequences of FIGS. 3 and 4 described above, the processor 120 may detect packet omission on the basis of a sequence number of a packet received from the transmission device 20. When packet omission is detected, retransmission is waited for (when not receiving ACK, the transmission device 20 retransmits a packet up to a maximum number of times). After being confirmed that all the packets have been received, the processor 120 may return a normal response to the accept ( ) system call to the application. Alternatively, in a case where there is a packet that cannot be received within a certain period of time from a time point at which packet loss is detected or from another arbitrarily determined time point, the processor 120 may no longer wait for the packet as timeout. In this case, the processor 120 provides only the data of the received packet to the application.

A difference in effect between the sequence of FIG. 3 and the sequence of FIG. 4 will be described. In the sequence of FIG. 3, since the application starts a data waiting operation at a timing when the connection request is received, the data received from the transmission device 20 can be passed to the application earlier. Therefore, data having a high degree of urgency can be delivered to the application at a high speed. On the other hand, since the application needs to perform the data waiting operation until all the data arrives from the transmission device 20, the load of the application (the load of the CPU that executes the application) increases. In particular, when data is received from a large number of transmission devices, a large number of file descriptors are generated, resulting in a possibility that performance may deteriorate. Also when processes or threads are generated in reception processing, a large number of processes or threads are generated, resulting in a possibility that performance may deteriorate. In addition, a packet may arrive late or may be retransmitted due to a deterioration in communication quality of the communication network 30, resulting in a possibility that the application may standby for a long time. On the other hand, in the sequence of FIG. 4, the application does not start a data waiting operation until all the data is received (until the connection notification condition is satisfied). After all the data are prepared, the application starts the waiting operation. Therefore, after the application starts the waiting operation, all the data can be acquired at a high speed. As a result, the application performs the waiting operation for a short time. Therefore, even when the application receives data from a large number of transmission devices 20, a file descriptor survival period (socket survival period) is short, thereby reducing the number of simultaneously operated descriptors (the number of sockets). As a result, the load of the application can be reduced.

Figure 5:
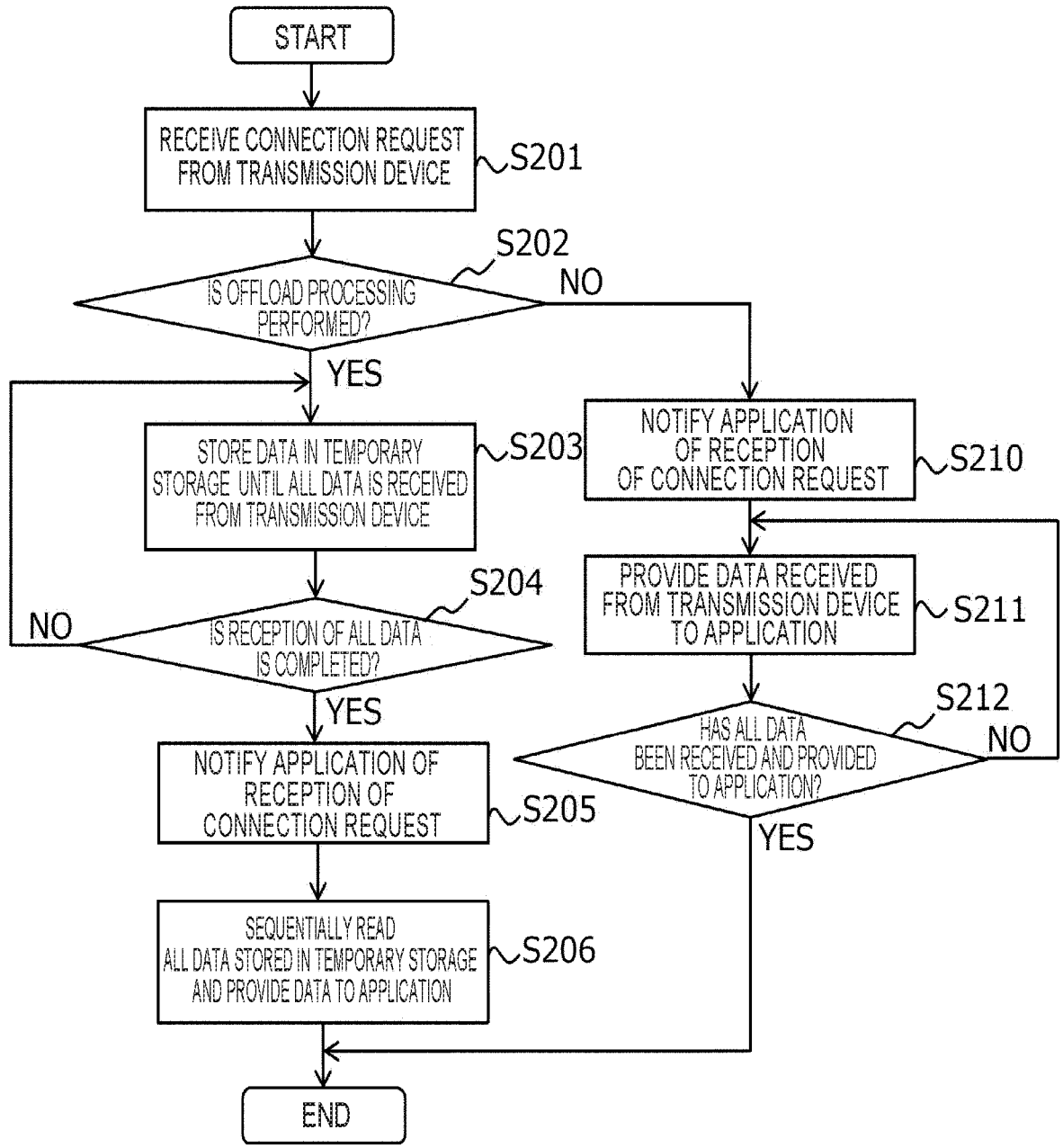
FIG. 5 is a flowchart illustrating an example of an operation of the reception device according to the first embodiment.

FIG. 5 is a flowchart illustrating an example of the operation of the reception device 10 according to the present embodiment. Here, an example of an operation in a case where the connection notification condition is satisfied when all the data is received from the transmission device 20 will be described. It is assumed that the application is waiting for a connection request by making an accept ( ) system call or the like.

The processor 120 of the reception device 10 receives a connection request from the transmission device 20 (S201). The processor 120 determines whether to perform offload processing on a data string received from the transmission device 20 using the offload determinator 130 (S202).

When it is determined not to perform offload processing (NO in S202), the processor 120 notifies the application of the reception of the connection request by transmitting a response to the accept ( ) system call or the like (S210). Furthermore, the processor 120 transmits an acknowledgement response to the connection request to the transmission device 20 after or before the notification. The processor 120 provides data sequentially received from the transmission device 20 to the application (S211). The received data may be temporarily stored in the temporary storage 140, and the data may be read from the temporary storage 140 and provided to the application. As an example, the processor 120 provides data to the application as a response to a receive ( ) system call made by the application. The processor 120 determines whether all the data has been received from the transmission device 20 and all the received data has been provided to the application (S212). When all the data has not yet been received or has not yet been provided to the application (NO in S212), reception of data and provision of data are repeated. When the reception of all the data and the provision of the data are completed (YES in S212), the processing ends.

When it is determined to perform offload processing (YES in S202), the processor 120 transmits an acknowledgement response to the connection request to the transmission device 20, and then stores all the data received from the transmission device 20 in the temporary storage 140 (NO in S204). When the reception of all the data is terminated (YES in S204), the processor 120 notifies the application of the reception of the connection request (S205). The processor 120 sequentially reads all the data stored in the temporary storage 140 and provides the data to the application (S206). The processor 120 may provide data to the application, for example, as a response to a receive ( ) system call made by the application. When all the data is provided to the application, the processor 120 ends the processing.

As described above, according to the present embodiment, even though the connection request is received from the transmission device 20, the data received from the transmission device 20 is temporarily stored in the temporary storage 140 (offload processing) without immediately notifying the reception of the connection request to the application. The reception of the connection request is notified to the application only when the connection notification condition is satisfied (for example, when all the data is received from the transmission device 20). After being notified, the application starts an operation of waiting for data. As a result, the application can start processing of waiting for data at a time point when the data is received, and the data can be provided to the application at a high speed. It is possible to reduce the load of the application. In addition, also in a case where data is acquired from a large number of transmission devices, the number of file descriptors existing at the same time and a survival period can be reduced.

Furthermore, according to the present embodiment, by determining whether to perform offload processing on a data string received from the transmission device 20, it is possible to switch whether to perform offload processing depending on a priority (e.g., a degree of urgency) of the data and the like. When the priority is high, offload processing is not performed, thereby making it possible to deliver data to the application at a high speed. When the priority is low, offload processing is performed, thereby making it possible to reduce the load of the application.

Further, in the present embodiment, it is also possible to terminate offload processing in the middle of the offload processing (notify the application that a connection request has been received). For example, a normal response to an accept ( ) system call may be returned at a time point when a predetermined amount or ratio of data is received. Alternatively, a normal response to an accept ( ) system call may be returned at a time point when the offload termination flag becomes an on state. As a result, when the degree of urgency becomes high while the transmission device is transmitting a data string, the received data can be provided to the application at a high speed.

Modification

In the configuration of FIG. 2, the reception processor 110 is included in the reception device 10, but the reception processor 110 may exist as an external device of the reception device 10.

Figure 6:
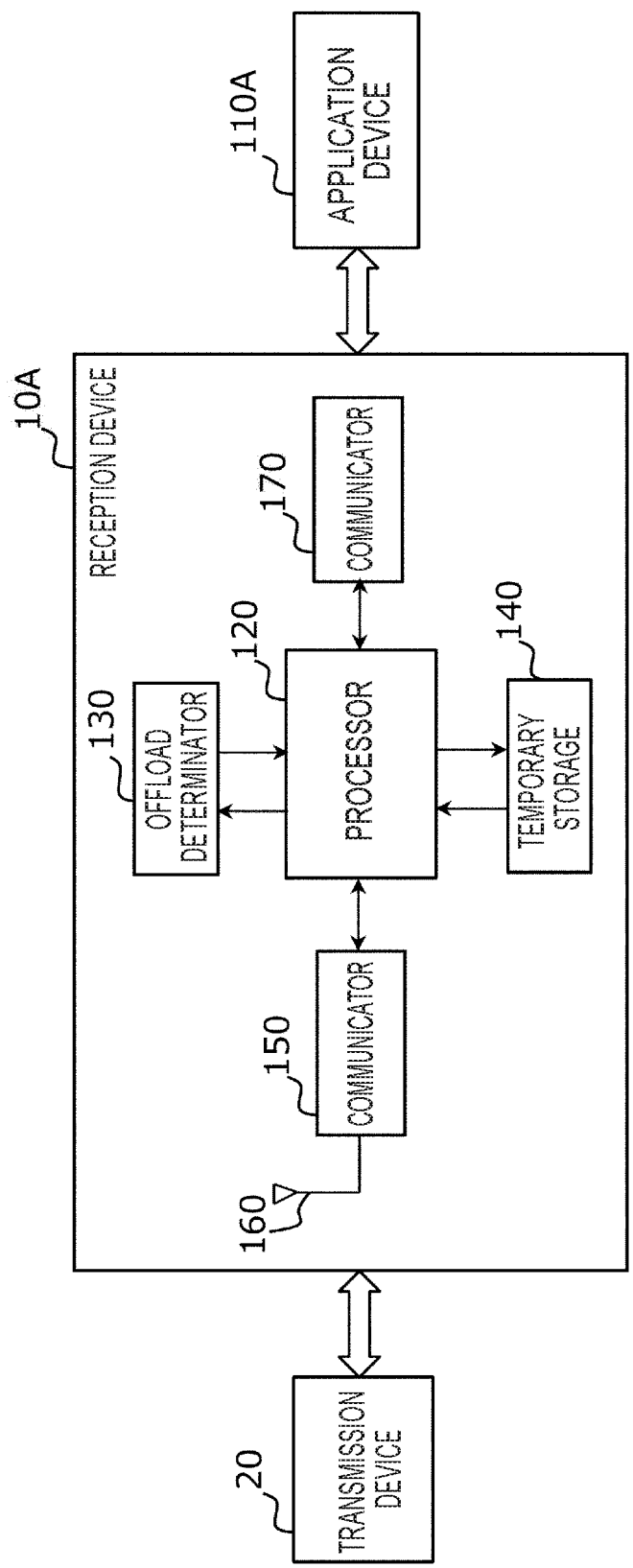
FIG. 6 is a diagram illustrating a schematic configuration in a case where a reception processor exists as an external device of the reception device.

FIG. 6 illustrates a schematic configuration in a case where the reception processor 110 exists as an external device (application device). An application device 110A is connected to the reception device 10A via a wireless or wired communication network. The communicator 170 is provided in the reception device 10A. The communicator 170 communicates with the application device 110A via a communication network. The communication network may be a local network such as a wireless LAN or Ethernet, a wide area network such as a mobile network or the Internet, or a serial communication cable such as a USB. Also in the configuration of FIG. 6, the same operation as that of the first embodiment is performed.

The present modification is similarly applicable to other embodiments to be described below.

Second Embodiment

In the present embodiment, data for a plurality of applications is collectively transmitted from the transmission device 20 in one packet as the same data flow. The reception device 10 sorts the data included in the packet by application, and each piece of data is provided to a corresponding application. At this time, whether to perform offload processing is determined for each application. The reception of the connection request is not notified to an application on which it is determined to perform offload processing until the connection notification condition is satisfied (for example, until all the data of the application is received). On the other hand, for an application on which it is determined not to perform offload processing, the reception of the connection request is notified to the application at a timing when the connection request is received. Hereinafter, differences from the first embodiment will be mainly described, and the same description as that of the first embodiment will be appropriately omitted.

In the present embodiment, a protocol for controlling a data flow (referred to as a data flow control protocol (DFCP)) is defined to include a plurality of applications in one packet. For example, a DFCP header is set to a layer upper than a transport layer such as TCP. As a result, data of a plurality of applications is included in one packet and managed.

Figure 7:
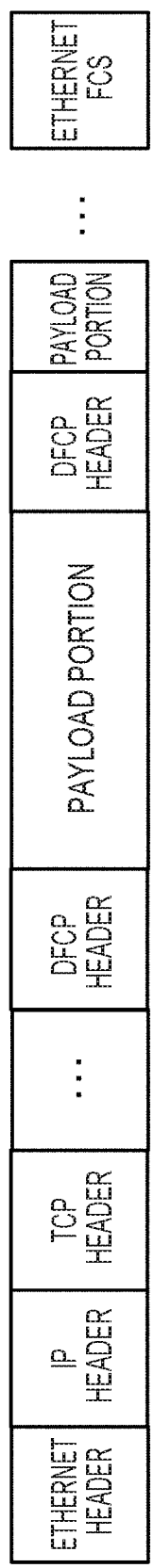
FIG. 7 is a diagram illustrating an example of a format of a packet according to a second embodiment.

FIG. 7 illustrates an example of a format of a packet according to the present embodiment. The packet in FIG. 7 is a packet of a data link layer. The packet of FIG. 7 includes an Ethernet header, an IP header, a TCP header, a DFCP header, a payload portion of the DFCP, and an Ethernet frame check sequence (FCS). Data to be transmitted to the application (e.g., data detected by the sensor) is stored in the payload portion of the DFCP. The DFCP is a higher-layer protocol than the TCP. Not all of these layers are essential, and other layers may be included. For example, a data flow management protocol (DFMP) that commonly manages a plurality of data flows may be defined, and a DFMP header may be added between the TCP header and the DFCP header.

In the DFCP header, for example, an ID for identifying a data flow or an application is stored. In addition, a sequence number (local sequence number) for each data flow may be stored in the DFCP header. In the example of the drawing, two DFCP headers are included, and data of different applications (e.g., data detected from different sensors) is stored in respective payload portions. The number of DFCP headers is not limited to two, and may be one or three or more. The packet in the format of FIG. 7 may be used in the first embodiment. In a case where a DFMP header is included, the DFMP header may include a sequence number (global sequence number) managed by the DFMP.

Similarly to the first embodiment, after being connected to the reception device 10, the transmission device 20 sequentially generates packets, each including data of a plurality of applications, and transmits the packets to the reception device 10.

A block diagram of the reception device 10 according to the present embodiment is the same as that according to the first embodiment (see FIG. 2). In the reception device 10, a plurality of (for example, two) applications wait for a connection request from the transmission device 20. When receiving a connection request from the transmission device 20, the offload determinator 130 determines whether to perform offload processing for each application. The processor 120 receives a packet including data of a plurality of applications from the transmission device 20, and extracts data of each application from the packet on the basis of the DFCP header. For data of an application on which it is determined to perform offload processing, the processor 120 performs processing similar to the steps S203 to S206 of FIG. 5 used in the first embodiment. For data of an application on which it is determined not to perform offload processing, the processor 120 performs processing similar to the steps S210 to S212 of FIG. 5. Details are omitted because they have been described in the first embodiment.

In order to provide data having a certain size to the application, the processor 120 may integrate the data extracted from the plurality of packets for each data flow. For example, the processor 120 entirely or partially combines data for application 1 included in a certain packet and data for application 1 included in a packet to be received next to make the data to have a certain size. The processor 120 provides data having a certain size to the application. As a result, data can be efficiently provided to the application. The data included in the plurality of packets may be combined in the first embodiment. For example, in a case where the communication network 30 has a low communication quality (for example, in a case where a packet error rate is high), it may be considered to shorten a packet length and combine data included in a plurality of packets on the reception device 10 side.

Modification

The first embodiment and the second embodiment may be combined. For example, the transmission device 20 first transmits data to separate packets by application (for example, for each of the application 1 and the application 2) according to the first embodiment. It is assumed that the data size for the application 1 decreases halfway. In a case where the data of the application 1 has a size allowing transmission in one packet even though combined with the data of the application 2, the data of the application 1 and the data of the application 2 are included in one packet from the middle according to the second embodiment. As a result, the number of packets to be transmitted can be reduced, and the load of the transmission device 20 and the load of the reception device 10 can be reduced.

Third Embodiment

The offload processing is performed by the reception device 10 in the first embodiment and the second embodiment, but offload processing is performed by the transmission device 20 in the third embodiment. The description of the same configuration and operation as those of the first embodiment and the second embodiment will be omitted as appropriate.

Figure 8:
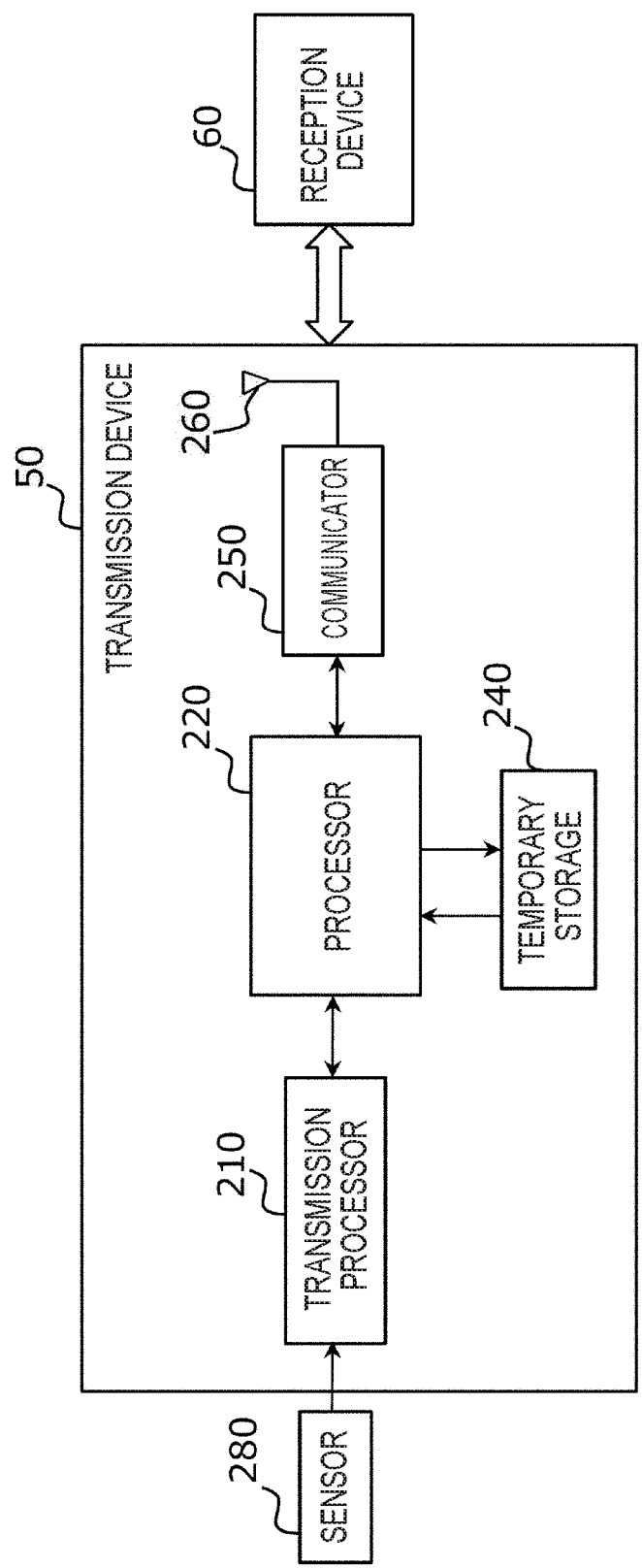
FIG. 8 is a block diagram of a transmission device according to a third embodiment.

FIG. 8 is a block diagram of a transmission device according to the third embodiment. A transmission device 50 communicates with a reception device 60. Although only one transmission device 50 is illustrated in FIG. 8, there may be a plurality of transmission devices 50. Also, the number of reception devices 60 is not limited to one. The configuration of the transmission device 50 of FIG. 8 only shows elements necessary for the description of the present embodiment, and may include various other elements such as an input unit to which a user inputs an instruction or data and an output unit that presents information to the user. Although the transmission device 50 illustrated in FIG. 8 performs wireless communication with the reception device 60, a configuration in which the transmission device 50 performs wired communication is also not excluded.

The transmission device 50 includes a transmission processor 210, a processor 220, a temporary storage 240, a communicator 250, and at least one antenna 260. The transmission device 50 is coupled to the sensor 280.

The communicator 250 communicates with the reception device 60 by transmitting and receiving wireless signals via the antenna 260. As an example, the communicator 250 performs encoding/decoding processing, modulation/demodulation processing, band adjustment, AD/DA conversion, signal amplification, and the like.

The transmission processor 210 is coupled to the sensor 280. The sensor 280 detects data for an application and outputs the detected data. In the example of FIG. 8, the number of sensors is one, but may be two or more. In this case, data for an application is detected for each sensor.

Examples of the sensors include a camera, a GPS, a LiDAR, a speed sensor, an acceleration sensor, a sensor for detecting vehicle control data (an engine rotation state, an accelerator pressing state, etc.), a sensor for detecting sudden braking, a sensor for detecting an obstacle (a falling object or a front vehicle), and the like. As an example, the sensor outputs data at regular intervals in time series (for example, outputs streaming data for 24 hours). Alternatively, the sensor outputs data at a specific timing such as a timing when an event occurs. For example, the sensor may detect data input from a user such as a passenger of an automobile via an operation unit. The output of one sensor corresponds to one data flow.

The transmission processor 210 sequentially acquires data detected from the sensor 280. The transmission processor 210 includes a data acquisition device that acquires data detected from the sensor 280. The transmission processor 210 may include a storage such as a memory that temporarily holds the acquired data inside, or outside to be accessible from the transmission processor 210. The transmission processor 210 is coupled to the processor 220 via a communication bus. The communication bus corresponds to a first communication medium for performing communication between the transmission processor 210 and the processor 220.

The transmission processor 210 transmits the data acquired from the sensor 280 to the processor 220 that performs offload processing. That is, the transmission processor 210 transmits the data to the processor 220, rather than transmitting the data to the reception device 60. The data may be transmitted as much as a certain size each time, or may be transmitted in units of data acquired from the sensor 280.

Any communication protocol may be used for transmission to the processor 220, but for example, IP/TCP can be used. Here, a case where IP/TCP is used will be described. In this case, similarly to the first embodiment, the transmission processor 210 may generate a file descriptor for identifying a socket, allocate a port number or the like to the socket, and transmit a packet to the processor 220 via the socket. The port number may be a port number of an application, or may be any port number. The transmission processor 210 transmits a connection request SYN to the processor 220, and starts transmission of data when receiving an acknowledgement response ACK from the processor 220. When the transmission of the data is terminated, a connection termination request FIN is transmitted. The connection request transmitted by the transmission processor 210 corresponds to, for example, a first connection request for data.

Since the transmission processor 210 and the processor 220 are coupled to each other by a communication bus (low-delay communication medium), data is transmitted to the processor 220 at a high speed.

The processor 220 is a proxy device that performs processing related to transmission and reception of data between the transmission processor 210 and the reception device 60. The processor 220 functions as a server for the transmission processor 210. The processor 220 has a function of performing offload processing for transmitting data to the reception device 60 instead of the transmission processor 210. In addition, the processor 220 performs processing related to IP/TCP. The processor 220 may further perform processing related to a physical layer and a data link layer. The processing related to the physical layer and the data link layer may be performed by the communicator 250. As an example, the processor 220 may be configured by a dedicated hardware circuit, may be configured by a program, or may be configured by both of them.

The processor 220 includes a receiver that receives a connection request (first connection request) for transmitting data for an application from the transmission processor 210 via the communication bus (first communication medium), and receives data from the transmission processor 210 via the first communication medium after the first connection request is received. In the receiver, the hardware circuit receiving a connection request and the hardware circuit receiving data may be the same, or the hardware circuit receiving a connection request and the hardware circuit receiving data may be different.

The processor 220 stores data received from the transmission processor 210 in the temporary storage 240. More specifically, the processor 220 receives a packet from the transmission processor 210, and stores data included in the received packet in the temporary storage 240. Since the processor 220 and the transmission processor 210 are coupled to each other by the communication bus, the processor 220 receives data sequentially transmitted from the transmission processor 210 at a high speed.

Instead of the transmission processor 210, the processor 220 transmits (transmits by proxy) the data received from the transmission processor 210 to the reception device 60. The processor 220 is connected to the reception device 60 via the communication network 30, and transmits data in the temporary storage 240 to an application of the reception device 60. The communication network 30 corresponds to a second communication medium for performing communication between the communicator 250 and the reception device 60.

A method of transmitting data to the reception device 60 may be similar to the method according to the first embodiment in which the transmission device 20 transmits data to the reception device 10. For example, the processor 220 transmits a connection request (second connection request) to the reception device 60 (for example, in a state where the application is waiting for a connection request according to an accept ( ) system call). When receiving an acknowledgement response from the reception device 60, the processor 220 starts transmission of data. When the transmission of the data is terminated, a connection termination request is transmitted. The port number of the application may be designated in advance, or when the port number of the application is used as a port number of a packet received from the transmission processor 210, the port number of the application may be specified from the packet.

The processor 220 transmits data to the reception device 60 in parallel with reception of data from the transmission processor 210. After receiving at least a connection request from the transmission processor 210, the processor 220 transmits the connection request to the reception device 60 before the reception of the data from the transmission device 50 is terminated.

The communicator 250 or the processor 220 includes a transmitter that transmits a connection request (second connection request) for transmitting data via the communication network 30 (second communication medium) before the reception of the data is terminated after the connection request (first connection request) is received from the transmission processor 210, and transmits data via the communication network 30 (second communication medium) after transmitting the connection request (second connection request). In the transmitter, the hardware circuit transmitting a connection request and the hardware circuit transmitting data may be the same, or the hardware circuit transmitting a connection request and the hardware circuit transmitting data may be different.

The reception device 60 may be configured in the same manner as the reception device 10 according to the first embodiment, or may be a reception device that performs a general operation. The reception device 60 provides the data received from the transmission device 50 to the application.

Figure 9:
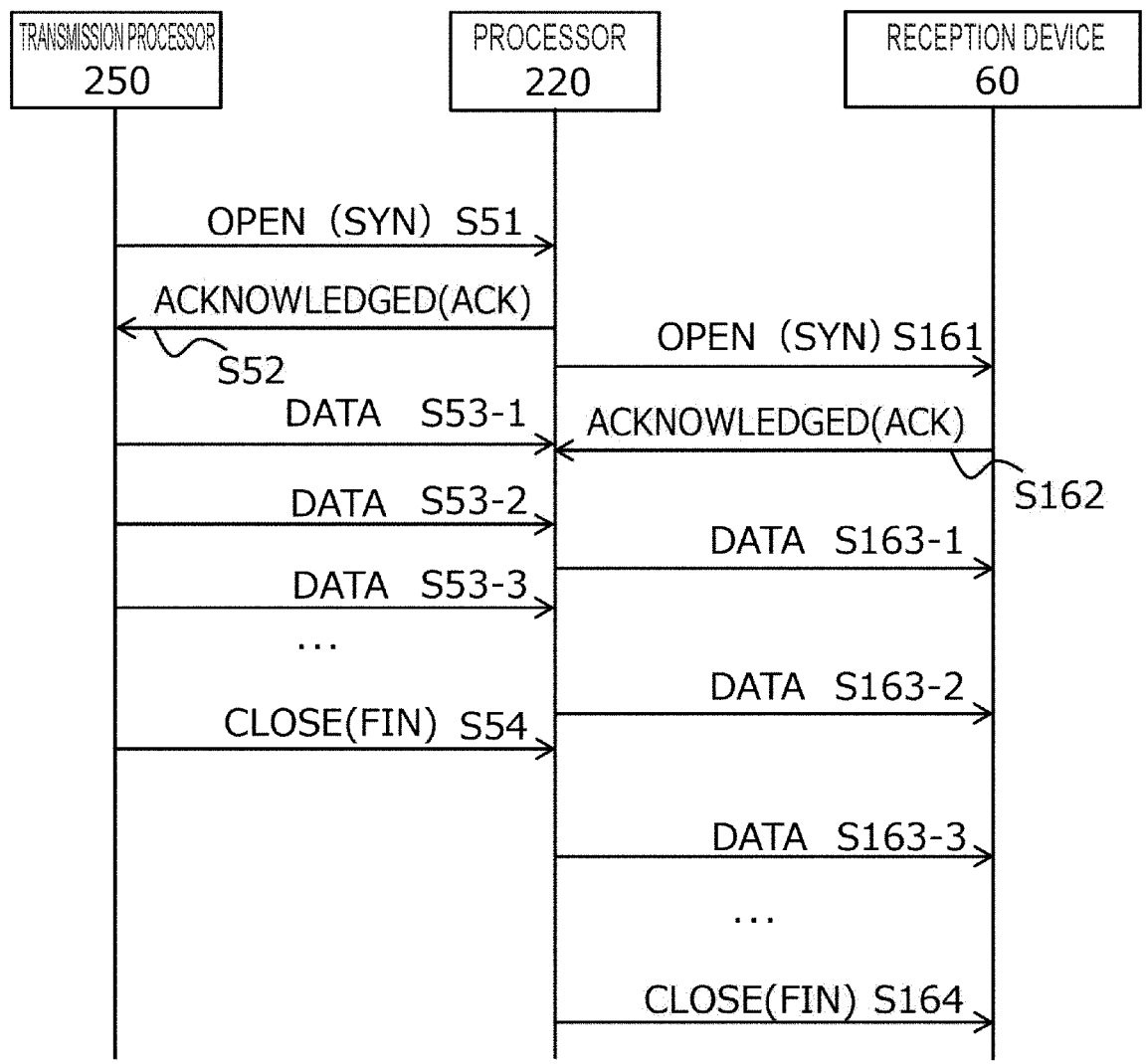
FIG. 9 is a diagram illustrating an example of an operation sequence in which a transmission device transmits data to a reception device.

FIG. 9 illustrates an example of an operation sequence in which the transmission device 50 transmits data to the reception device 60.

The transmission processor 210 of the transmission device 50 acquires a data string from the sensor 280. In parallel with the acquisition of the data string or when the acquisition of the data string is terminated, the transmission processor 210 transmits data to the processor 220. The transmission processor 210 transmits a connection request SYN to the processor 220 (S51). When receiving an acknowledgement response ACK from the processor 220 (S52), the transmission processor 210 starts transmitting a data string (S53-1, S53-2, S53-3, . . . ). When the transmission of the data string is terminated, the transmission processor 210 transmits a connection termination request FIN to the processor 220 (S54).

After transmitting an acknowledgement response to the transmission processor 210, the processor 220 sequentially receives data transmitted from the transmission processor 210 and stores the received data in the temporary storage 240. The processor 220 transmits an acknowledgement response to each piece of data to the transmission device 50. The processor 220 transmits the connection request SYN to the transmission device 50 (S161). The transmission of the connection request may be performed after the acknowledgement response is transmitted to the transmission processor 210 and before the reception of the data is started, or may be performed after the reception of the data from the transmission processor 210 is started. Note that the transmission of the connection request after termination of reception of the data string from the transmission processor 210 is not excluded. When receiving an acknowledgement response ACK from the reception device 60 (S162), the processor 220 sequentially reads data from the temporary storage 240 and transmits the data to the reception device 60. When the transmission of all the data received from the transmission processor 210 is terminated, the processor 220 transmits a connection termination request FIN (S164). Note that some data may not reach the reception device 60 due to retransmission timeout.

The reception device 60 provides the data received from the transmission device 50 to the application.

Figure 10:
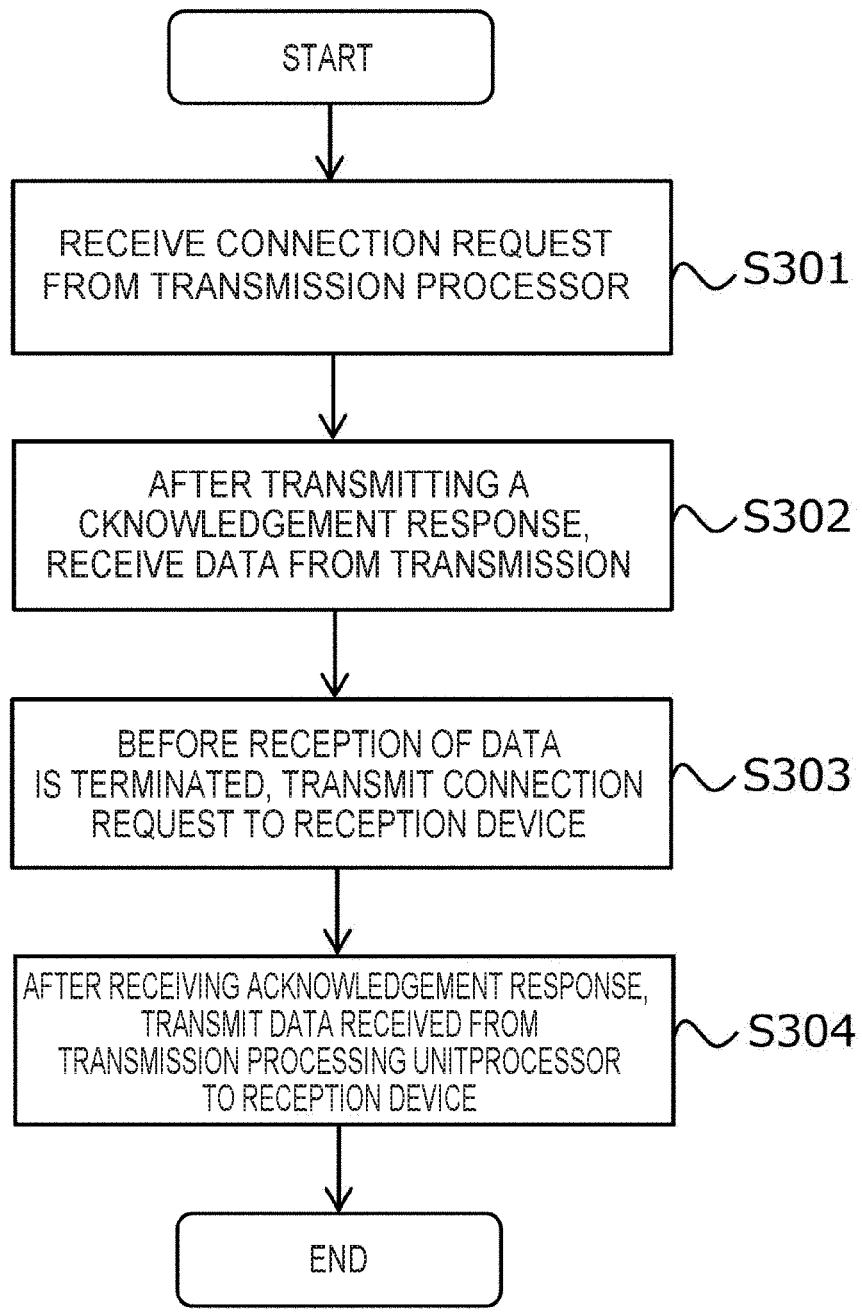
FIG. 10 is a flowchart illustrating an example of an operation of the transmission device according to the third embodiment.

FIG. 10 is a flowchart illustrating an example of an operation of the transmission device 50 according to the present embodiment. It is assumed that the processor 220 of the transmission device 50 is waiting for a connection request by making an accept ( ) system call or the like.

The processor 220 receives a connection request from the transmission processor 210 via the communication bus (S301). After transmitting an acknowledgement response to the connection request, the processor 220 receives data from the transmission processor 210 via the communication bus (S302). The processor 220 temporarily stores the received data in the temporary storage 240. The processor 220 transmits the connection request to the reception device 60 via the communication network 30 before the reception of the data from the transmission processor 210 is terminated (S303). The transmission of the connection request may be performed before the reception of the data from the transmission processor 210 is started, or may be performed after the reception of the data from the transmission processor 210 is started. The processor 220 receives an acknowledgement response to the connection request from the reception device 60. The processor 220 sequentially reads the data received from the transmission processor 210 from the temporary storage 240, and transmits the data to the reception device 60 via the communication network 30 (S304). When the transmission of all the data is terminated, the processor 220 transmits a connection termination request to the reception device 60.

As described above, according to the present embodiment, the transmission processor 210 transmits data to the processor 220 via the communication bus, and the processor 220 transmits data to the reception device 60 via the communication network. As compared with data directly transmitted by the transmission processor 210 to the reception device, the data can be transmitted to the processor 220 at a high speed, thereby reducing a load of the transmission processor 210 (for example, a load of a CPU that executes a program for performing data transmission processing).

For example, when a delay or the like occurs due to the communication quality of the communication network 30, it takes some time until the transmission of all the data from the transmission device 50 is terminated. Even in such a case, in the present embodiment, the transmission processor 210 can transmit data at a high speed without being affected by the delay or the like, because the transmission processor 210 only needs to transmit data to the processor 220 via the communication bus. Therefore, a load in executing a program in the transmission processor 210 can be reduced, and a deterioration in performance of the CPU can be suppressed.

First Modification

In a case where the transmission processor 210 transmits data for a plurality of applications corresponding to a plurality of sensors to the processor 220, the processor 220 may collectively transmit the data for the plurality of applications in one packet. That is, a plurality of data flows are combined into one data flow. For example, the data of the plurality of applications can be stored in one packet using the above-described data flow control protocol (DFCP) (see FIG. 7). At this time, an amount or a ratio of data for each application included in one packet may be controlled depending on a priority of each piece of data (a priority of each application). For example, an amount or a ratio of data having a high priority (e.g., a degree of urgency) is larger than an amount or a ratio of data having a low priority.

Second Modification

In the configuration of FIG. 8, the transmission processor 210 is included in the transmission device 50, but the transmission processor 210 may exist as a device separate from the transmission device 50 as an external device of the transmission device 50.

Figure 11:
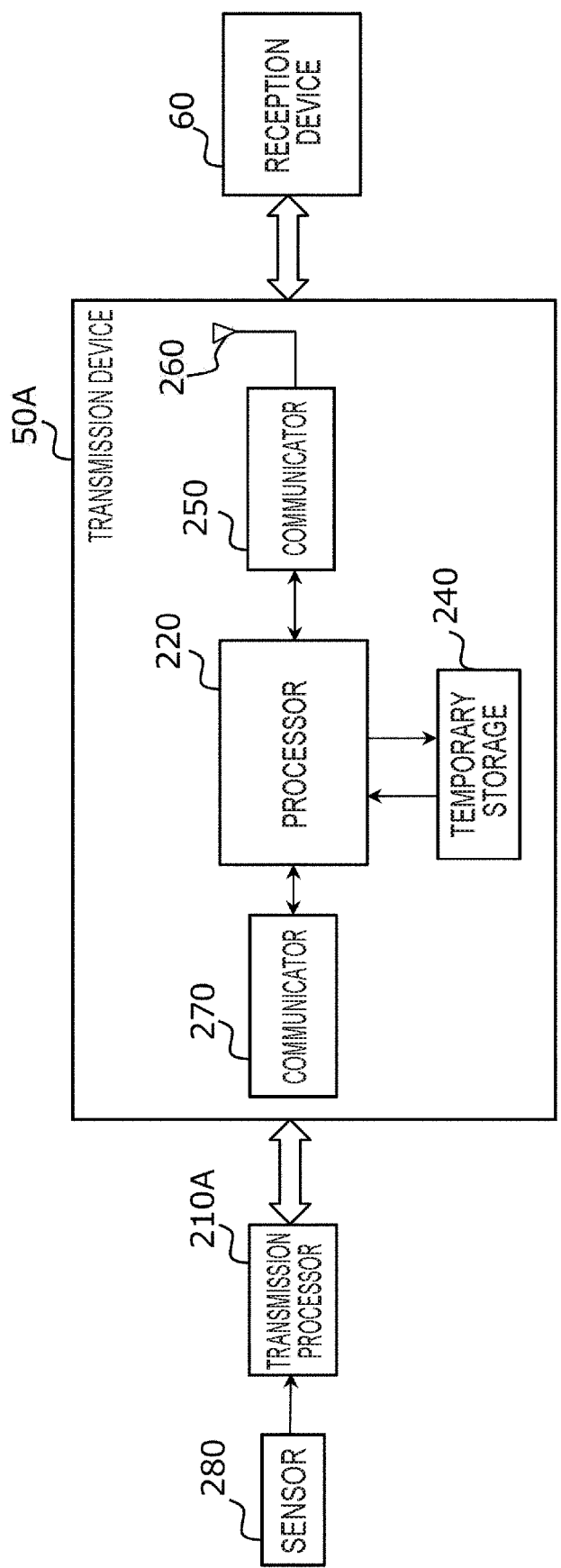
FIG. 11 is a diagram illustrating a schematic configuration in a case where a transmission processor exists as an external device of the transmission device.
Figure 12:
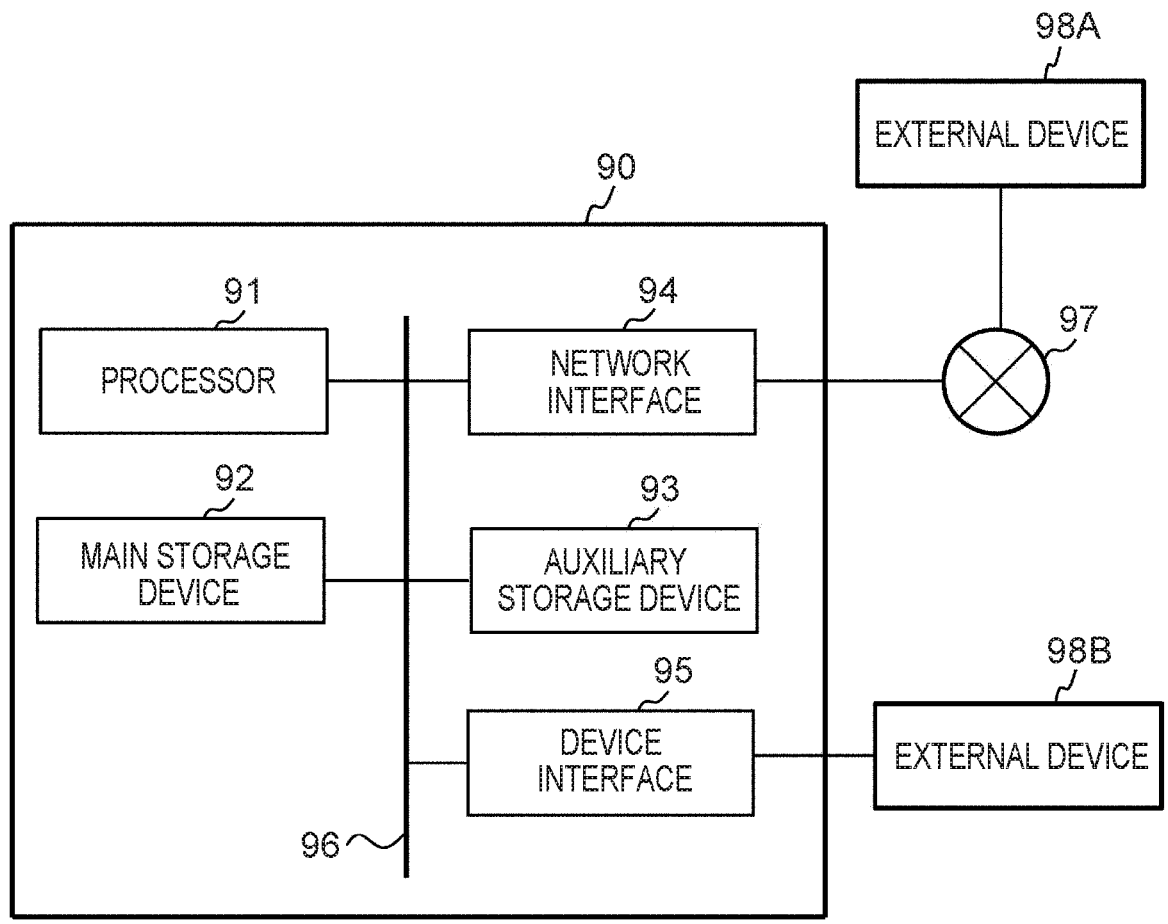
FIG. 12 is a block diagram illustrating an example of a hardware configuration of the transmission device or the reception device.

FIG. 11 illustrates a schematic configuration in a case where the transmission processor 210 exists as a transmission processing device 210A. The transmission processing device 210A includes a data acquisition device that acquires data from the sensor 280. The transmission processing device 210A is connected to a transmission device 50A via a communication medium (first communication medium). The first communication medium has a lower delay than the communication network 30 that is a communication medium (second communication medium) between the transmission device 50A and the reception device 60. The transmission device 50A includes a communicator 270 that communicates with the transmission processing device 210A.

The communicator 270 communicates with the transmission processing device 210A via the first communication medium. The first communication medium may be a serial communication cable such as a USB, a local network such as a wireless LAN or Ethernet, or a wide area network such as a mobile network or the Internet. The communicator 270 or the processor 220 includes a first receiver that receives a connection request (first connection request) for transmitting data for an application from the transmission processor 210 via the first communication medium, and a second receiver that receives data from the transmission processor 210 via the first communication medium after the first connection request is received. In the configuration of FIG. 11, the same operation as that of the second embodiment is performed.

Some or all of each device (the transmission device 20 or the reception device 10) in the above embodiment may be configured in hardware, or information processing of software (program) executed by, for example, a CPU (Central Processing Unit), GPU (Graphics Processing Unit). In the case of the information processing of software, software that enables at least some of the functions of each device in the above embodiments may be stored in a non-volatile storage medium (non-volatile computer readable medium) such as CD-ROM (Compact Disc Read Only Memory) or USB (Universal Serial Bus) memory, and the information processing of software may be executed by loading the software into a computer. In addition, the software may also be downloaded through a communication network. Further, entire or a part of the software may be implemented in a circuit such as an ASIC (Application Specific Integrated Circuit) or FPGA (Field Programmable Gate Array), wherein the information processing of the software may be executed by hardware.

A storage medium to store the software may be a removable storage media such as an optical disk, or a fixed type storage medium such as a hard disk, or a memory. The storage medium may be provided inside the computer (a main storage device or an auxiliary storage device) or outside the computer.

FIG. 14 is a block diagram illustrating an example of a hardware configuration of each device (the transmission device 20 or the reception device 10) in the above embodiments. As an example, each device may be implemented as a computer 90 provided with a processor 91, a main storage device 92, an auxiliary storage device 93, a network interface 94, and a device interface 95, which are connected via a bus 96.

The computer 90 of FIG. 14 is provided with each component one by one but may be provided with a plurality of the same components. Although one computer 90 is illustrated in FIG. 14, the software may be installed on a plurality of computers, and each of the plurality of computer may execute the same or a different part of the software processing. In this case, it may be in a form of distributed computing where each of the computers communicates with each of the computers through, for example, the network interface 94 to execute the processing. That is, each device (the transmission device 20 or the reception device 10) in the above embodiments may be configured as a system where one or more computers execute the instructions stored in one or more storages to enable functions. Each device may be configured such that the information transmitted from a terminal is processed by one or more computers provided on a cloud and results of the processing are transmitted to the terminal.

Various arithmetic operations of each device (the transmission device 20 or the reception device 10) in the above embodiments may be executed in parallel processing using one or more processors or using a plurality of computers over a network. The various arithmetic operations may be allocated to a plurality of arithmetic cores in the processor and executed in parallel processing. Some or all the processes, means, or the like of the present disclosure may be implemented by at least one of the processors or the storage devices provided on a cloud that can communicate with the computer 90 via a network. Thus, each device in the above embodiments may be in a form of parallel computing by one or more computers.

The processor 91 may be an electronic circuit (such as, for example, a processor, processing circuitry, processing circuitry, CPU, GPU, FPGA, or ASIC) that executes at least controlling the computer or arithmetic calculations. The processor 91 may also be, for example, a general-purpose processing circuit, a dedicated processing circuit designed to perform specific operations, or a semiconductor device which includes both the general-purpose processing circuit and the dedicated processing circuit. Further, the processor 91 may also include, for example, an optical circuit or an arithmetic function based on quantum computing.

The processor 91 may execute an arithmetic processing based on data and/or a software input from, for example, each device of the internal configuration of the computer 90, and may output an arithmetic result and a control signal, for example, to each device. The processor 91 may control each component of the computer 90 by executing, for example, an OS (Operating System), or an application of the computer 90.

Each device (the transmission device 20 or the reception device 10) in the above embodiments may be enabled by one or more processors 91. The processor 91 may refer to one or more electronic circuits located on one chip, or one or more electronic circuitries arranged on two or more chips or devices. In the case of a plurality of electronic circuitries are used, each electronic circuit may communicate by wired or wireless.

The main storage device 92 may store, for example, instructions to be executed by the processor 91 or various data, and the information stored in the main storage device 92 may be read out by the processor 91. The auxiliary storage device 93 is a storage device other than the main storage device 92. These storage devices shall mean any electronic component capable of storing electronic information and may be a semiconductor memory. The semiconductor memory may be either a volatile or non-volatile memory. The storage device for storing various data or the like in each device (the transmission device 20 or the reception device 10) in the above embodiments may be enabled by the main storage device 92 or the auxiliary storage device 93 or may be implemented by a built-in memory built into the processor 91. For example, the storages 102, 202 in the above embodiments may be implemented in the main storage device 92 or the auxiliary storage device 93.

In the case of each device (the transmission device 20 or the reception device 10) in the above embodiments is configured by at least one storage device (memory) and at least one of a plurality of processors connected/coupled to/with this at least one storage device, at least one of the plurality of processors may be connected to a single storage device. Or at least one of the plurality of storages may be connected to a single processor. Or each device may include a configuration where at least one of the plurality of processors is connected to at least one of the plurality of storage devices. Further, this configuration may be implemented by a storage device and a processor included in a plurality of computers. Moreover, each device may include a configuration where a storage device is integrated with a processor (for example, a cache memory including an L1 cache or an L2 cache).

The network interface 94 is an interface for connecting to a communication network 97 by wireless or wired. The network interface 94 may be an appropriate interface such as an interface compatible with existing communication standards. With the network interface 94, information may be exchanged with an external device 98A connected via the communication network 97. Note that the communication network 97 may be, for example, configured as WAN (Wide Area Network), LAN (Local Area Network), or PAN (Personal Area Network), or a combination of thereof, and may be such that information can be exchanged between the computer 90 and the external device 98A. The internet is an example of WAN, IEEE802.11 or Ethernet (registered trademark) is an example of LAN, and Bluetooth (registered trademark) or NFC (Near Field Communication) is an example of PAN.

The device interface 95 is an interface such as, for example, a USB that directly connects to the external device 98B.

The external device 98A is a device connected to the computer 90 via a network. The external device 98B is a device directly connected to the computer 90.

The external device 98A or the external device 98B may be, as an example, an input device. The input device is, for example, a device such as a camera, a microphone, a motion capture, at least one of various sensors, a keyboard, a mouse, or a touch panel, and gives the acquired information to the computer 90. Further, it may be a device including an input unit such as a personal computer, a tablet terminal, or a smartphone, which may have an input unit, a memory, and a processor.

The external device 98A or the external device 98B may be, as an example, an output device. The output device may be, for example, a display device such as, for example, an LCD (Liquid Crystal Display), or an organic EL (Electro Luminescence) panel, or a speaker which outputs audio. Moreover, it may be a device including an output unit such as, for example, a personal computer, a tablet terminal, or a smartphone, which may have an output unit, a memory, and a processor.

Further, the external device 98A or the external device 98B may be a storage device (memory). The external device 98A may be, for example, a network storage device, and the external device 98B may be, for example, an HDD storage.

Furthermore, the external device 98A or the external device 98B may be a device that has at least one function of the configuration element of each device (the transmission device 20 or the reception device 10) in the above embodiments. That is, the computer 90 may transmit a part of or all of processing results to the external device 98A or the external device 98B, or receive a part of or all of processing results from the external device 98A or the external device 98B.

In the present specification (including the claims), the representation (including similar expressions) of "at least one of a, b, and c" or "at least one of a, b, or c" includes any combinations of a, b, c, a-b, a-c, b-c, and a-b c. It also covers combinations with multiple instances of any element such as, for example, a-a, a-b-b, or a-a-b-b-c-c. It further covers, for example, adding another element d beyond a, b, and/or c, such that a-b-c-d.

In the present specification (including the claims), the expressions such as, for example, "data as input," "using data," "based on data," "according to data," or "in accordance with data" (including similar expressions) are used, unless otherwise specified, this includes cases where data itself is used, or the cases where data is processed in some ways (for example, noise added data, normalized data, feature quantities extracted from the data, or intermediate representation of the data) are used. When it is stated that some results can be obtained "by inputting data," "by using data," "based on data," "according to data," "in accordance with data" (including similar expressions), unless otherwise specified, this may include cases where the result is obtained based only on the data, and may also include cases where the result is obtained by being affected factors, conditions, and/or states, or the like by other data than the data. When it is stated that "output/outputting data" (including similar expressions), unless otherwise specified, this also includes cases where the data itself is used as output, or the cases where the data is processed in some ways (for example, the data added noise, the data normalized, feature quantity extracted from the data, or intermediate representation of the data) is used as the output.

In the present specification (including the claims), when the terms such as "connected (connection)" and "coupled (coupling)" are used, they are intended as non-limiting terms that include any of "direct connection/coupling," "indirect connection/coupling," "electrically connection/coupling," "communicatively connection/coupling," "operatively connection/coupling," "physically connection/coupling," or the like. The terms should be interpreted accordingly, depending on the context in which they are used, but any forms of connection/coupling that are not intentionally or naturally excluded should be construed as included in the terms and interpreted in a non-exclusive manner.

In the present specification (including the claims), when the expression such as "A configured to B," this may include that a physically structure of A has a configuration that can execute operation B, as well as a permanent or a temporary setting/configuration of element A is configured/set to actually execute operation B. For example, when the element A is a general-purpose processor, the processor may have a hardware configuration capable of executing the operation B and may be configured to actually execute the operation B by setting the permanent or the temporary program (instructions). Moreover, when the element A is a dedicated processor, a dedicated arithmetic circuit, or the like, a circuit structure of the processor or the like may be implemented to actually execute the operation B, irrespective of whether or not control instructions and data are actually attached thereto.

In the present specification (including the claims), when a term referring to inclusion or possession (for example, "comprising/including," "having," or the like) is used, it is intended as an open-ended term, including the case of inclusion or possession an object other than the object indicated by the object of the term. If the object of these terms implying inclusion or possession is an expression that does not specify a quantity or suggests a singular number (an expression with a or an article), the expression should be construed as not being limited to a specific number.

In the present specification (including the claims), although when the expression such as "one or more," "at least one," or the like is used in some places, and the expression that does not specify a quantity or suggests a singular number (the expression with a or an article) is used elsewhere, it is not intended that this expression means "one." In general, the expression that does not specify a quantity or suggests a singular number (the expression with a or an as article) should be interpreted as not necessarily limited to a specific number.

In the present specification, when it is stated that a particular configuration of an example results in a particular effect (advantage/result), unless there are some other reasons, it should be understood that the effect is also obtained for one or more other embodiments having the configuration. However, it should be understood that the presence or absence of such an effect generally depends on various factors, conditions, and/or states, etc., and that such an effect is not always achieved by the configuration. The effect is merely achieved by the configuration in the embodiments when various factors, conditions, and/or states, etc., are met, but the effect is not always obtained in the claimed invention that defines the configuration or a similar configuration.

In the present specification (including the claims), when the term such as "maximize/maximization" is used, this includes finding a global maximum value, finding an approximate value of the global maximum value, finding a local maximum value, and finding an approximate value of the local maximum value, should be interpreted as appropriate accordingly depending on the context in which the term is used. It also includes finding on the approximated value of these maximum values probabilistically or heuristically. Similarly, when the term such as "minimize" is used, this includes finding a global minimum value, finding an approximated value of the global minimum value, finding a local minimum value, and finding an approximated value of the local minimum value, and should be interpreted as appropriate accordingly depending on the context in which the term is used. It also includes finding the approximated value of these minimum values probabilistically or heuristically. Similarly, when the term such as "optimize" is used, this includes finding a global optimum value, finding an approximated value of the global optimum value, finding a local optimum value, and finding an approximated value of the local optimum value, and should be interpreted as appropriate accordingly depending on the context in which the term is used. It also includes finding the approximated value of these optimal values probabilistically or heuristically.

In the present specification (including claims), when a plurality of hardware performs a predetermined process, the respective hardware may cooperate to perform the predetermined process, or some hardware may perform all the predetermined process. Further, a part of the hardware may perform a part of the predetermined process, and the other hardware may perform the rest of the predetermined process. In the present specification (including claims), when an expression (including similar expressions) such as "one or more hardware perform a first process and the one or more hardware perform a second process," or the like, is used, the hardware that perform the first process and the hardware that perform the second process may be the same hardware, or may be the different hardware. That is: the hardware that perform the first process and the hardware that perform the second process may be included in the one or more hardware. Note that, the hardware may include an electronic circuit, a device including the electronic circuit, or the like.

In the present specification (including the claims), when a plurality of storage devices (memories) store data, an individual storage device among the plurality of storage devices may store only a part of the data or may store the entire data. Further, some storage devices among the plurality of storage devices may include a configuration for storing data.

While certain embodiments of the present disclosure have been described in detail above, the present disclosure is not limited to the individual embodiments described above. Various additions, changes, substitutions, partial deletions, etc. are possible to the extent that they do not deviate from the conceptual idea and purpose of the present disclosure derived from the contents specified in the claims and their equivalents. For example, when numerical values or mathematical formulas are used in the description in the above-described embodiments, they are shown for illustrative purposes only and do not limit the scope of the present disclosure. Further, the order of each operation shown in the embodiments is also an example, and does not limit the scope of the present disclosure.

REFERENCE SIGNS LIST

10 Reception device
10A Reception device
20 Transmission device
30 Communication network
50 Transmission device
50A Transmission device
60 Reception device
90 Computer
91 Processor
92 Main storage device
93 Auxiliary storage device
94 Network interface
95 Device interface
96 Bus
97 Communication network
98A External device
98B External device
110 Reception processor
110A Application device
120 Processor
130 Offload determinator
140 Temporary storage
150 Communicator
160 Antenna
170 Communicator
210 Transmission processor
210A Transmission processing device
220 Processor
240 Temporary storage
250 Communicator
260 Antenna
270 Communicator
280 Sensor

The invention claimed is:

1. A communication device comprising:
one or more processors configured to:
receive a connection request from a transmission device that transmits data for an application,
receive the data after receiving the connection request, wherein the one or more processors are configured to withhold providing notification of reception of the connection request to the application until a plurality of the received data has been accumulated, and
determine whether to withhold the notification of the reception of the connection request to the application based on characteristics of the received data, the characteristics of the received data including at least one of priority of the data or urgency of the data.

2. The communication device according to claim 1, wherein the one or more processors are configured to provide the notification of the reception of the connection request to the application when one of a predetermined amount of the data is received or a predetermined ratio of the data is received.

3. The communication device according to claim 1, wherein the one or more processors are configured to provide the notification of the reception of the connection request to the application based on a ratio of an amount of data that has already been received to an amount of data to be received.

4. The communication device according to claim 1, wherein the one or more processors accumulate data for a plurality of applications.

5. The communication device according to claim 1, wherein the one or more processors are configured such that during withholding of the notification, the withholding is terminated based on a predetermined terminating condition.

6. The communication device according to claim 5, wherein the predetermined terminating condition is satisfied when a priority of a data transmission is increased.

7. A data communication method comprising:
receiving a connection request from a transmission device that transmits data for an application;
receiving the data after receiving the connection request;
withholding providing notification of reception of the connection request to the application until a plurality of the received data has been accumulated; and
determining whether to withhold the notification of the reception of the connection request to the application based on characteristics of the received data, the characteristics of the received data including at least one of priority of the data or urgency of the data.

8. A non-transitory computer readable medium storing instructions that are executable by one or more processors to perform a data communication method, the method comprising:
receiving a connection request from a transmission device that transmits data for an application;

receiving the data after receiving the connection request;
withholding providing notification of reception of the connection request to the application until a plurality of the received data has been accumulated; and
determining whether to withhold the notification of the reception of the connection request to the application based on characteristics of the received data, the characteristics of the received data including at least one of priority of the data or urgency of the data.

* * * * *